United States Patent
Allen et al.

(10) Patent No.: US 9,913,235 B2
(45) Date of Patent: Mar. 6, 2018

(54) APPARATUS, AND ASSOCIATED METHOD, FOR FACILITATING RADIO CONTROL SYSTEM OPERATION WITH AN ICS-CAPABLE WIRELESS DEVICE

(71) Applicant: BLACKBERRY LIMITED, Waterloo (CA)

(72) Inventors: Andrew Allen, Mundelein, IL (US); Adrian Buckley, Tracy, CA (US); Jan Hendrik Lucas Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 326 days.

(21) Appl. No.: 13/669,140

(22) Filed: Nov. 5, 2012

(65) Prior Publication Data
US 2013/0308599 A1 Nov. 21, 2013

Related U.S. Application Data

(63) Continuation of application No. 12/423,637, filed on Apr. 14, 2009, now Pat. No. 8,315,236.

(60) Provisional application No. 61/044,568, filed on Apr. 14, 2008.

(51) Int. Cl.
*H04W 4/00* (2009.01)
*H04W 60/00* (2009.01)
(Continued)

(52) U.S. Cl.
CPC ......... *H04W 60/00* (2013.01); *H04L 65/1006* (2013.01); *H04M 7/123* (2013.01);
(Continued)

(58) Field of Classification Search
CPC ..... H04W 48/18; H04W 48/12; H04W 76/02; H04W 80/04; H04W 80/10; H04W 88/06;
(Continued)

(56) References Cited

U.S. PATENT DOCUMENTS 7,324,443 B2 1/2008 Chuah et al.
8,203,982 B2 * 6/2012 Mutikainen et al. ......... 370/310
(Continued)

FOREIGN PATENT DOCUMENTS

DE 102006028324 A1 12/2007
GB 2439365 12/2007
WO 2008/155148 A1 12/2008

OTHER PUBLICATIONS

S2-082191, "ICS Termination with UE Assisted T-ADS in Case No Simlutaneous PS and CS Support," 3GPP TSG SA WG2 Meeting #64, Jeju Island, South Korea, Apr. 7-11, 2008.
(Continued)

*Primary Examiner* — Harun Chowdhury
(74) *Attorney, Agent, or Firm* — Trop, Pruner & Hu, P.C.

(57) ABSTRACT

An apparatus, and an associated method, for facilitating communication operations with a wireless device that is ICS or DTM capable. A message generator is provided, configured to generate a network-terminated message, the network-terminated message including a media feature tag that identifies support of ICS. When transmitted to a network node, the message is detected. And, a wireless-device-terminated message that provides for mapping of a SIP URI into a calling name presentation.

14 Claims, 16 Drawing Sheets

(51) Int. Cl.
*H04M 7/12* (2006.01)
*H04W 8/24* (2009.01)
*H04L 29/06* (2006.01)
*H04W 76/02* (2009.01)

(52) U.S. Cl.
CPC ........... *H04M 7/1235* (2013.01); *H04W 8/24* (2013.01); *H04L 65/1016* (2013.01); *H04W 76/02* (2013.01)

(58) Field of Classification Search
CPC ........ H04W 60/00; H04W 8/24; H04L 67/14; H04L 65/1016; H04L 65/1006; H04M 7/123; H04M 7/1235
USPC .......................... 370/310, 312, 328–332, 352
See application file for complete search history.

(56) References Cited

U.S. PATENT DOCUMENTS

| | | | | |
|---|---|---|---|---|
| 2005/0141484 | A1* | 6/2005 | Rasanen | H04L 12/56 370/352 |
| 2007/0015498 | A1 | 1/2007 | Giacalone et al. | |
| 2008/0305793 | A1 | 12/2008 | Gallagher et al. | |
| 2008/0316998 | A1* | 12/2008 | Procopio et al. | 370/352 |
| 2010/0246523 | A1 | 9/2010 | Astrom et al. | |

OTHER PUBLICATIONS

TD S2-082326, "ICS UE Procedures: Service Continuity," 3GPP TSG SA WG2 Meeting #64, Jeju Island, South Korea, Apr. 7-11, 2008.
TD S2-082549, "ICS UE Procedures: Gm-I1 Fall Back Flows," 3GPP TSG SA WG2 Meeting #64, 2008.
S2-082701, "Change Request," 3GPP TSG SA WG2 Meeting #64, Jeju Island, South Korea, Apr. 7-11, 2008.
TD S2-082793, "Location Information and Network Access Type for T-ADS," 3GPP TSG SA WG2 Meeting #64, Jeju Island, South Korea, Apr. 7-11, 2008.
European Patent Office, EP Appl. No. 13156329.8, Communication pursuant to Article 94(3) EPC dated Jan. 22, 2014 (6 pages).
European Patent Office, Int. Appl. No. PCT/US2009/040549, Written Opinion of the International Searching Authority dated Jul. 6, 2009 (7 pages).
European Patent Office, Int. Appl. No. PCT/US2009/040549, International Search Report dated Jul. 6, 2009 (6 pages).
ETSI TS 123 279 V7.7.0, Technical Specification, Digital cellular telecommunications system (Phase 2+);Universal Mobile Telecommunications System (UMTS); Combining Circuit Switched (CS) and IP Multimedia Subsystem (IMS) services; Stage 2, (3GPP TS 23.279 version 7.7.0 Release 7) (Oct. 2007) (38 pages).
3GPP TR 23.892 V1.0.0, Technical Report, 3rd Generation Partnership Project; Technical Specification Group Services and System Aspects; IP Multimedia System (IMS) centralized services (Release 8) (Jun. 2007) (69 pages).
Canadian Intellectual Property Office, Canadian Appl. No. 2,721,275, Office Action dated Mar. 15, 2012 (3 pages).
Rosenberg et al., Caller Preferences for the Session Initiation Protocol (SIP), Network Working Group, Request for Comments: 3841, Catgory: Standards Track, Aug. 2004 (27 pages).
Rosenberg et al., Indicating User Agent Capabilities in the Session Initiation Protocol (SIP), Network Working Group, Request for Comments: 3840, Category: Standards Track, Aug. 2004 (34 pages).

\* cited by examiner

| 8 | 7 | 6 | 5 | 4 | 3 | 2 | 1 | |
|---|---|---|---|---|---|---|---|---|
| | Facility IEI | | | | | | | octet 1 |
| Length of facility contents | | | | | | | | octet 2 |
| Facility information (see 3GPP TS 24.080) | | | | | | | | octet 3-?* |

FIG. 28

APPARATUS, AND ASSOCIATED METHOD, FOR FACILITATING RADIO CONTROL SYSTEM OPERATION WITH AN ICS-CAPABLE WIRELESS DEVICE

The present disclosure relates generally to a manner by which to operate an IMS Centralized Service (ICS)-, or Dual Transfer Mode (DTM)-, capable wireless device in a radio communication system. More particularly, the present disclosure relates to an apparatus, and an associated method, by which to provide indication to a network of ICS or DTM capabilities available to the wireless device depending, e.g., on its location, and to provide for subsequent communication operations in response thereto.

The manner by which the wireless device performs call set-up and the manner by which supplementary call service control is carried out is dependent upon the capabilities available to the wireless device.

BACKGROUND OF THE DISCLOSURE

Advancements in digital communication technologies have permitted the development and deployment of communication systems having increased communication capacities and additional communication features. Radio communication systems, such as cellular and cellular-like communication systems, are exemplary of communication systems that make increasing use of digital communication technologies and techniques. While early-generation, cellular communication systems used analog communication techniques, successor communication systems make increasing use of digital communication technologies. Earlier, successor systems provide digital communication capabilities and also utilize circuit-switched (CS) communications in which dedicated channels are used for at least some communication services. Newer, as well as proposed, successor systems provide for end-to-end, packet-based communication services.

Amongst the services provided by new-generation systems are IMS (IP multimedia subsystem) centralized services. These services include, e.g., call waiting, call hold, and call forwarding. IMS centralized services are typically controlled by SIP/XCAP-based protocols, but the bearer is typically run by way of a circuit-switched connection in which SIP (Session Initiation Protocol) is run all the way to a wireless device using either an IP network, e.g., GPRS (General Packet Radio Service), in conjunction with circuit-switched connections of a circuit switched network or by defining a SIP derivative over a circuit-switched signaling, such as USSD (Unstructured Supplementary Data Service), SMS, another transport protocol, etc.

Two manners are currently defined by which a wireless device sets-up and terminates service control signaling pursuant to an IMS centralized service (ICS). The first manner is by way of a Gm interface. For a wireless device to be able to utilize the Gm interface, the wireless device must be DTM (Dual Transfer Mode), GPRS, and SIP capable. And, the other currently-defined manner is for the wireless device to utilize an Il reference point, proposed to use USSD but could be but not limited to SMS etc. The Il reference point is specified to cater to specific situations, such as when the wireless device does not have GPRS service, the network is not DTM capable, etc. In the context used herein, DTM means that the UE has the capability to perform both Circuit Switched (CS) and Packet Switched (PS) type operations in a simultaneous or near simultaneous manner. One example comprises DTM capability in a GERAN network. As those skilled in the art know, there are many other manners in which this could be achieved, such as, but not limited to, those capabilities of UTRAN or a multi radio device that is able to transmit and receive on multi radios. However, if the network is not DTM capable, mid call supplementary service operations cannot be performed. As an example, if the wireless device is in a session on a UTRAN network and another session is on hold and the wireless then moves, i.e., is handed off to, a GERAN network and, as a result, the wireless device is no longer able to retrieve the session that is on hold as DTM is not available. One existing solution, when DTM is not available, is for the wireless device to decide not to register with the IMS home network. The IMS network knows that the wireless device is reachable only by way of circuit-switched connections and that SIP is not available. However, in the event that the wireless device is to carry out other IMS services, such as PoC, OMA, SIMPLE, or other services, the wireless device must register with the IMS home network. When these, or other IMS services are to be used, therefore, not registering is not a viable solution. If the wireless device has to register with the home IMS because of other services, the IMS home network will not be aware that the wireless device is not in an area that is DTM capable, and the IMS home network attempts to set-up calls using IMS services. Call operations will not work.

Additionally, in conventional operation, a problem also is exhibited in the event that the wireless device loses packet access needed to control the IMS centralized services. And, when a Gm interface is not available, only Il is available. No protocol is presently defined for use of the Il reference point, particularly for mid-session services.

Existing communication system operation as it relates to IMS centralized services exhibits various problems that might interfere with, or prevent, the performance of an IMS, or other DTM, service.

An improved set-up and service termination control signaling for IMS centralized services is therefore needed.

It is in light of this background information related to radio communications that the significant improvements of the present disclosure have evolved.

BRIEF DESCRIPTION OF THE DRAWINGS

FIG. 28 shows a table listing a content of a facility information.

DETAILED DESCRIPTION

Figure 1:
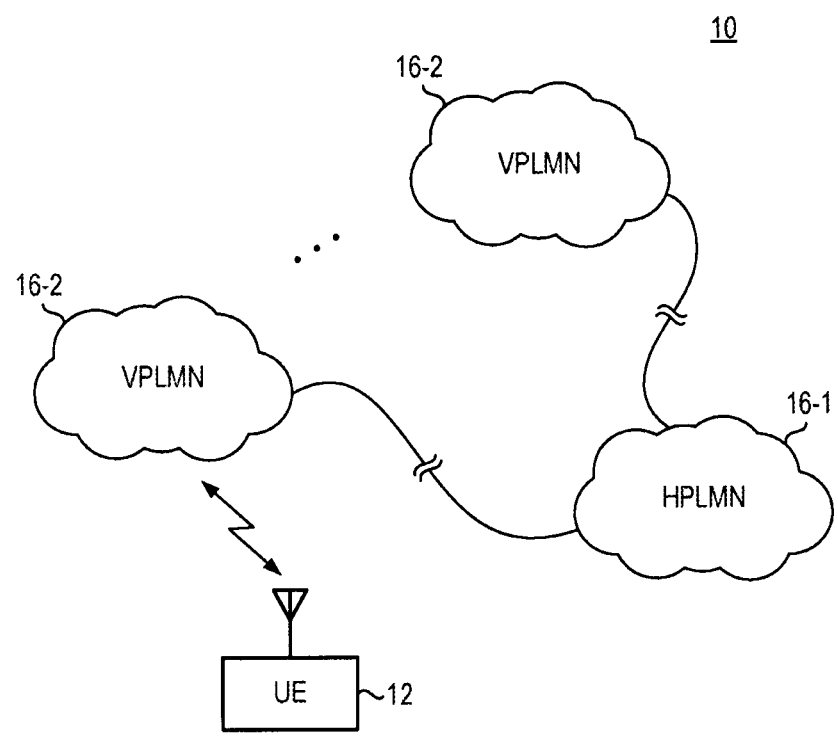
FIG. 1 illustrates a functional block diagram of an exemplary radio communication system in which an embodiment of the present disclosure is operable.

The present disclosure, accordingly, advantageously provides an apparatus, and an associated methodology, by which to operate an ICS-capable, or DTM-capable, wireless device in a radio communication system.

Through operation of an embodiment of the present disclosure, a manner is provided by which to provide indications to a network of ICS or DTM capabilities available to the wireless device and to provide for subsequent communication operations in response thereto.

In one aspect of the present disclosure, a wireless device detects the communication capabilities of a network in whose coverage area that the wireless device is positioned. The network capability of a network is provided to the wireless device, e.g., in signals broadcast by networks during their normal operation. In this manner, the wireless device detects whether the network is DTM (dual transfer mode) capable. If the wireless device determines that the network available to the wireless device is not DTM capable, the wireless device performs call set-up and supplementary service control using traditional 3GPP (Third Generation Partnership Project) signaling or USSD (Unstructured Supplementary Service Data) tunneling with 3GPP signaling.

In another aspect of the present disclosure, when the wireless device determines that the network available to the wireless device for communications is not DTM capable, and IMS centralized services are therefore not available at the wireless device, the wireless device sends an indication to its home network to indicate that the wireless device is not capable of receiving an IMS centralized service.

Problems associated with the existing systems and protocols when the wireless device is positioned at a location at which DTM capability and, hence, IMS centralized services, are not available are obviated. The network records the indication that the wireless device is not capable of receiving an IMS centralized service. The indication is later accessible in the event that a communication session subsequently is requested with the wireless device.

In these and other aspects, therefore, an apparatus, and an associated method, is provided for facilitating operation at a wireless device capable of using IMS, IP multimedia subsystem, centralized services. A network-change is detected in network-sent information sent to the wireless device. A determination is made as to whether the network-change indicates a network that supports a selected IMS service. An indication is provided responsive to the determination.

In these and further aspects, further apparatus, and an associated methodology, is provided at a communication network for facilitating ICS-capable, wireless-device operation. A wireless device-originated message is detected. The message includes an indication whether an ICS session is supported. The indication is stored. And, the indication is accessed when a wireless-device communication session is requested. A determination is made whether the wireless-device session is supportable based upon the accessed indication.

Turning first to FIG. 1, a radio communication system, shown generally at 10, provides for radio communications with wireless devices of which the user equipment (UE) 12 is representative. The UE is any of various devices capable, directly or indirectly, to communicate with or by way of a network part of the radio communication system. In an actual communication system, typically, large numbers of wireless devices communicate concurrently during operation of the communication system. The user equipment 12 communicates with a network part of the communication system, such as pursuant to a communication session. The network of the communication system includes a plurality of PLMNs (public land mobile networks) 16. Here, the PLMN 16-1 is designated as a home PLMN (HPLMN) associated with the UE 12 and a plurality of PLMNs are designated as visited PLMNs (VPLMNs) 16-2 with which the UE is capable of communicating, if positioned in the coverage area thereof. The communication system shown in FIG. 1 is merely exemplary, and the communication system is alternately implementable in any of various configurations using any of various communication technologies.

Here, the UE 12 is ICS-capable. That is to say, the UE is capable of being a party to a communication session in which IMS (IP multimedia subsystem) centralized services, such as call waiting, call hold, call forwarding, etc., are permitted. As noted previously, however, the network in whose coverage area that the UE is positioned to communicate must be of a configuration to permit the ICS to be provided. The position of the UE, therefore, is, in part, determinative of whether the ICS-capable UE is able to participate in a communication session in which an ICS is provided.

Pursuant to operation of the network portion of the communication system, signals are broadcast, or otherwise sent, by base stations of the various PLMNs that provide various information about the base stations and associated PLMNs. The information includes the network capabilities relating to DTM (dual transfer mode) capabilities, which are required for an ICS, or, directly, identify the ICS capability of the network. A UE that is DTM-capable is generally considered to be a UE that is capable of performing both circuit-switched (CS) and packet-switched (PS) types of operations in a simultaneous or near simultaneous manner. This capability is inherently built into UTRAN (Universal Terrestrial Access Network) and LTE (Long Term Evolution) networks but GERAN was designed in a later phase; thus the network needs to signal its support of DTM and the UE must also support DTM.

During operation of the UE 12, the UE monitors and detects signals sent from a network in whose coverage area that the UE is positioned. The signals sent by the network are, e.g., sent responsive to UE polling or are otherwise provided to the UE, such as by automatic sending or periodic broadcast. If the signals detected by the UE indicate that the network is not DTM capable, and therefore unable to provide an ICS, the UE subsequently performs call set-up and supplementary service control using either traditional 3GPP signaling or USSD tunneling using 3GPP signaling. Additionally, when the UE detects that the network is not DTM-capable, various features are prevented from being used. For instance, if the UE includes an address book, having entries that contain SIP URIs, the UE prevents an SIP URI from being selected as an identity to contact pursuant to an ICS service, such as a voice call; however the Tel URI that maybe associated with the contact can be selected and used. In another implementation, if an address book entry contains an SIP URI and a Tel URI or a telephone number, and the SIP URI is selected, the telephone number/Tel URI or SIP URI with a user equals "phone", or another manner is utilized to encode a circuit-switched address using a SIP URI for a call set-up digit string. A user of the UE, in one implementation, is notified of the encoding. Other services that rely on the availability of DTM are "greyed out" or otherwise prevented from being used responsive to the detection by the UE of the unavailability of DTM or ICS.

Figure 2:
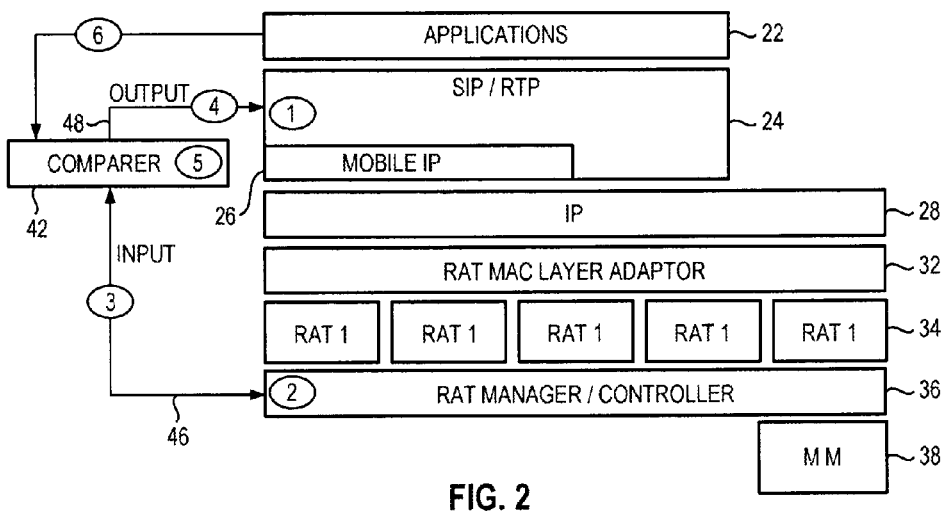
FIG. 2 illustrates a functional representation of a portion of a wireless device forming part of the radio communication system shown in FIG. 1.

FIG. 2 illustrates parts of the UE 12 shown in FIG. 1, including a logical-layer representation of portions of the UE. An application layer 22, a SIP/RTP layer 24, a mobile IP layer 26, an IP layer 28, a RAT MAC layer adaptor 32, a plurality of radio access technology types 34, a radio access technology manager/controller 36 and a MM layer 38. A comparer 42 provides a comparison functionality at the UE.

In operation, when the RAT manager/control 36 notices a change in the radio access technology in network-broadcast or sent information, the manager collects the received information and the radio access technology-type. The radio access technology-type comprises, for instance, but not limited to 802.11a,b,g,b,u, WiMax, CDMA2000, LTE, GERAN, UTRAN, TDMA, MIMO, FOMA, CTI, CT2, Cordless, Satellite etc. Communication-type indication of the received information and radio access type are provided, indicated by the segment 46, to the comparer 42. The comparer compares the received information with memory-stored information, either stored internally, externally, or both, which comprises, e.g., an operator or user policy. A determination is made, based upon the received information and the stored information, whether an ICS or other DTM related feature is supported by the network. Responsive to the comparison, an indication is provided, here indicated by way of the line 48, to a network messaging function at the layer 24. The indication is to inform the network if an SIP UA at the layer 24 supports the feature or not and to indicate which network type should be used in SIP messages, e.g., how the P-network-access-info header information should be populated.

Figure 3:
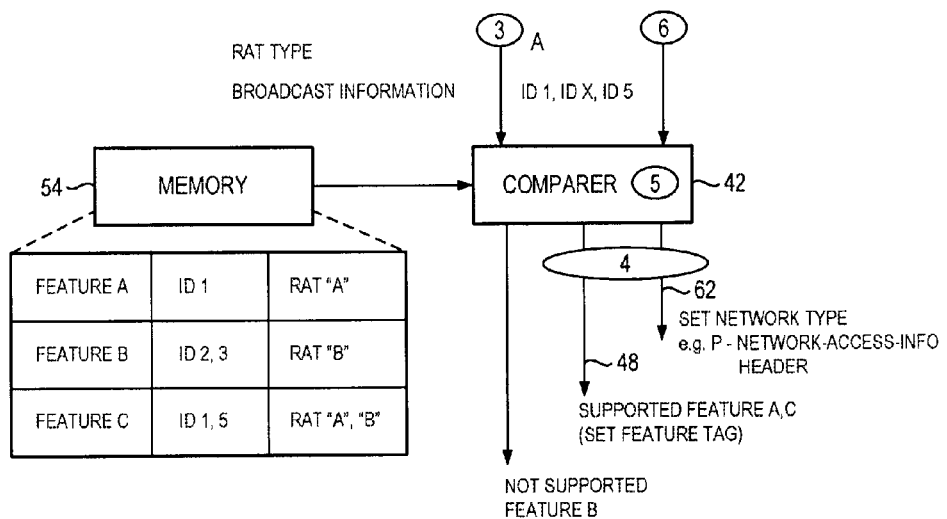
FIG. 3 illustrates another functional representation of a portion of the wireless device that forms part of the radio communication system shown in FIG. 1.

FIG. 3 illustrates part of the UE 12 shown in FIGS. 1 and 2. Here, in addition to the comparer 42, a memory element 54 is shown. The memory element stores the operator and user policy, and the exemplary contents 56, shown in FIG. 3, identifies features, IDs, and radio access types (RATs). The exemplary contents index against each of the features A, B, and C, the identifiers, which are compared by the comparer 42 against the received, and broadcast information and radio access technology, whose application to the comparer is indicated on the line 46. Results of the comparison are again indicated on the line 48. If the stored identifier does not match with the received information, the comparer indicates on the line 48 that the feature is not supported. The comparer 42 is here shown further to provide an indication on the line 62 to set any network type that needs to signal the network, e.g., to set the P-network-access-info header in an SIP message, such as an INVITE message, etc. In one implementation, the capabilities of a UE also changes with the turning-on or turning-off of an application, such as by a user of the UE or the UE disabling the application. In such a scenario, e.g., generation of a new SIP REGISTRATION, identifies the new capabilities where by appropriate feature tags are, or are not, included.

Figure 4:
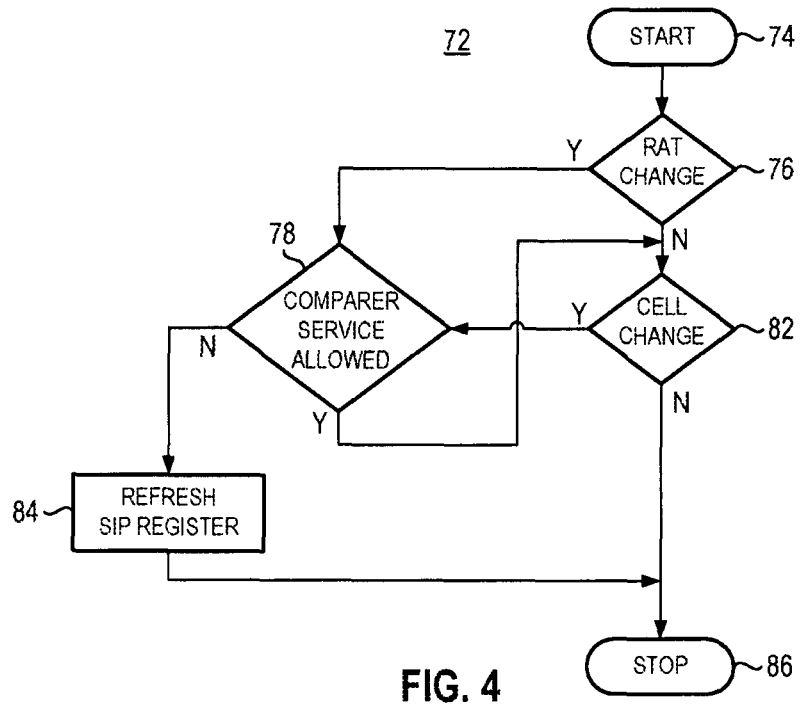
FIG. 4 illustrates a process diagram representative of the process of operation of an embodiment of the present disclosure.

FIG. 4 illustrates a process diagram, shown generally at 72, representative of exemplary operation of the UE 12. Subsequent to starting, indicated by the start block 74, a determination is made, indicated by the decision block 76, as to whether a change in radio access technology (RAT) of a network is detected. If so, the yes branch is taken to the decision block 78; otherwise, the no branch is taken to the decision block 82.

At the decision block 78, a determination is made as to whether the comparer indicates a service is allowed. If yes, the yes branch is taken to the decision block 82. Otherwise, the no branch is taken to the block 84 and a refresh SIP REGISTER is generated. A path extends from the block 84 to the stop block 86.

At the decision block 82, a determination is made as whether there is a cell change. If so, the yes branch is taken to the decision block 78; otherwise the no branch is taken to the stop block 86.

Figure 5:
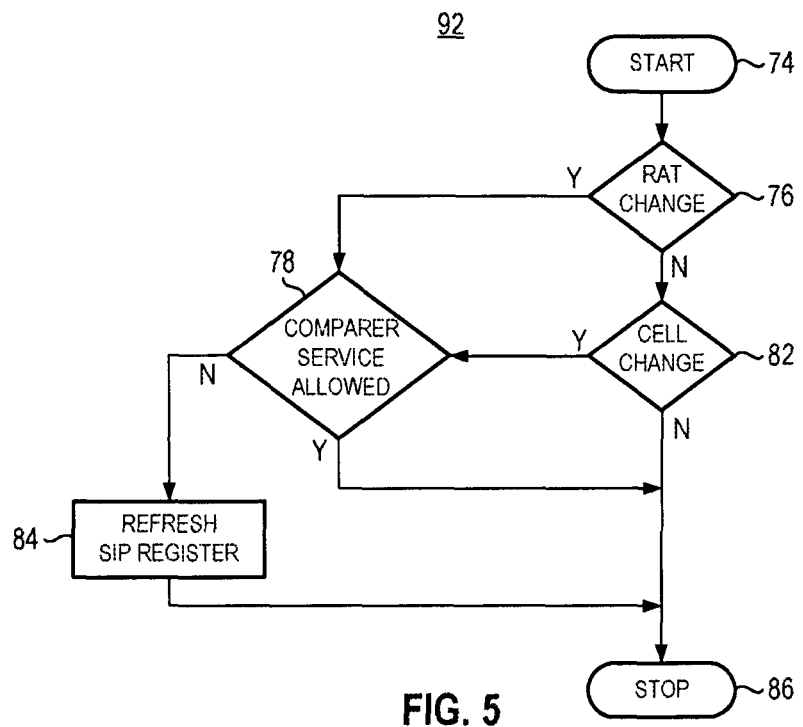
FIG. 5 illustrates another process diagram, also representative of exemplary operation of an embodiment of the present disclosure.

FIG. 5 illustrates another process diagram, shown generally at 92, representative of alternate operation of the UE 12. The process 92 is analogous to the process 72, shown is FIG. 4, and functions of the process 92, which correspond to those of the process 72 are identified by common reference numerals. Here, the process 92 differs with the process 72 in that the yes branch taken from the decision block 72 extends to the stop block 86 rather than to the cell change decision block 82.

Responsive to obtaining a radio access technology indication, changing of the radio access technology, or of a cell change, the UE scans networks, as per existing protocols. In one scenario, as a result of the scanning/obtaining network information, the UE 12 finds a system information broadcast message, e.g., a GERAN SI13 or PSI1/PSI13/PSI14 message. The UE collects, or otherwise obtains, the information, and the information is stored. The UE subsequently compares the stored information obtained from the scanning/obtaining network information operations with stored operator and user policy information. One example is shown in the below table.

| Service - Policy | Capabilities of Cell | RAT type |
| --- | --- | --- |
| ICS | DTM required (e.g. could be SI13 with bit location) | GERAN, UTRAN |

In this example, the ICS service requires that DTM be supported for the service to be registered. The comparer of the UE compares the received information, which indicates whether DTM is needed. If the UE needs to perform an IMS registration, and the cell supports DTM, the UE, in an implementation of the present disclosure, sends an IMS REGISTRATION. In the IMS registration, a token or identifier indicates that DTM or ICS is supported. The identifier comprises, e.g., an SIP URI feature tag, a P-header, an XML body, or a P-network-access-info header, coded, e.g., as <ICS-no DTM>, etc. When an SIP URI feature tag is used, in one implementation, the signaling that is utilized is pursuant to RFC 3840 mechanisms.

If the UE 12 is already registered at an IMS network, such as at a first VPLM 16-1, shown in FIG. 1, and then enters an area, i.e., a cell or RAT, such as the area encompassed by a second VPLM 16-2 in which DTM is not supported, then the UE 12 performs an IMS refresh registration to update service capabilities available to it. In one implementation, the UE provides an explicit indication that DTM/ICS is not supported by way of the feature tag e.g. RFC 3840 mechanisms etc, P-header, XML body, network info header, or other identifier. In an alternate implementation, the UE registers without an explicit indication. This lack of indication indicates that DTM/ICS is not supported at the location at which UE is positioned.

If the UE 12 originally registered in a cell where DTM was not supported and thereafter is positioned at an area encompassed by a network that supports DTM, the UE performs an IMS registration using the procedures set forth above.

The same procedures are utilized when a specific RAT is required for an ICS. For example, a particular ICS is permitted only when the UE is communicating by way of a UTRAN. The following table indicates this exemplary scenario.

| Service | Capabilities of Cell | RAT type |
| --- | --- | --- |
| ICS | N/A | UTRAN |

If the UE is operating in conjunction with a UTRAN, the UE performs a REGISTER, as described above. If the UE loses UTRAN coverage, the UE performs a SIP REGISTRATION indicating that ICS is not supported. In an alternate implementation, a refresh REGISTRATION is sent as the REGISTRATION that would have a new P-network-access-info header value. The change in this header field value can be used by the network node, SCC AS, to determine whether or not ICS is supported.

The network part of the communication system includes an S-CSCF, which receives a SIP registration message that contains an indication of the DTM/ICS support. If a network entity, such as an access server (AS) has subscribed to the registration event package, the S-CSCF sends the registration event package to provide the identifier, or lack of identifier, to the network entity. The indication is stored at the network entity such as at a domain selection function (DSF) of the AS, or other entity. Those skilled in the art will appreciate that the DSF can also be known as Terminating Access Domain Selection (T-ADS) function. When a terminating call arrives at the appropriate network entity, such as an SIP AS, the access server determines if the subscriber who has subscribed to ICS can support an ICS session in which signaling is sent over one media path and the bearer over another path. The access server consults with the DSF, taking into account such criteria as support for DTM/ICS. If the DSF has an indication that the ICS cannot be supported, and the session can be supported in a manner in which the signaling and bearer are provided on the same signaling path, then the session is routed to an SIP element that can route the session over that bearer, e.g., to a media gateway. Those skilled in the art will appreciate that the media gateway could be co-located with an MSC. In one implementation, the SIP AS routes the session to the media gateway by including, in an accept contact header, a feature tag indicating that a circuit-switched domain should be used for signaling and media, e.g. MSC Server enhanced for ICS services etc. And, in one implementation, the access server obtains a routing number to direct the signaling and media to a media gateway and subsequently on to a VMSC (visited network mobile switching center).

In another implementation, the SIP AS sets a reject-contact-header to a value that indicates that the network does not support DTM. Upon receipt of this value at the S-CSCF, the S-CSCF does not pick any contacts with the network that does not support DTM. The S-CSCF routes a call to an acceptable contact.

In another implementation, the UE 12 knows that the cell does support DTM, and the UE rejects any SIP message, e.g., an SIP INVITE message, associated with applications that require DTM, such as ICS. This association is performed, for example, by analyzing a received SIP URI feature tag, a P-header, an XML body, or an SDP description. An indication is coded, e.g., within one of these to indicate an ICS session or DTM being required.

The rejection is carried out by sending an SIP message to the network, such as an SIP 406 not acceptable, an SIP 480 temporarily unavailable, an SIP 606 not acceptable-warning header field coded as 302, etc.

In this implementation, the SIP access server sends out a SIP message, e.g., a SIP INVITE message, to the UE. And, the AS receives, in return, an error code, such as the aforementioned 406, 480, 606, etc., error code. Upon receiving the error code, the access server attempts to send the SIP message once again. The SIP AS consults with the DSF in order to establish whether the signaling and bearer can be established over the same transport to the UE such as, e.g., in the circuit-switched domain. If the signaling end bearer is able to be communicated upon the same signaling path, then the session is routed to an SIP element, such as a media gateway, that can route the session over the bearer. In order to attempt to route the session to the media gateway, the SAP AS, e.g., includes in the accept contact header, a feature tag that indicates that the circuit-switched domain should be used for signaling and media. And, e.g., the access server obtains a routing number, e.g. CSRN, MSRN to direct the signaling and media.

In another implementation, the UE 12 knows that the cell does not provide DTM, and the UE accepts an incoming INVITE message. The UE, in this implementation, signals back by a SIP method, e.g., in a 200 OK message, that the requested feature tag in the accept contact header is not supported.

In this implementation, at the network, the access server sends out an SIP message, e.g., an SIP INVITE message to the UE. In response to the message, the network receives back a SIP method e.g. 200 OK message indicated that the service is not supported.

In another implementation, the UE is made aware that the service is not supported, e.g., the DTM is not supported, and the UE receives an incoming INVITE message. The UE sends an SIP 3xx provisional response to indicate an alternative contact address, e.g., 302. An existing RFC 3261 states that, "the contact header field contains URIs giving the new locations or user names to try, or may simply specify additional transport parameters. A 301 (moved permanently) or 302 (moved temporarily) response may also give the same location and user name that was targeted by the initial request but specify additional transport parameters such as a different server or multicast address to try, or a change of SIP transport from UDP to TCP or vice versa." The contact address is, e.g., a generic address, which is understood by the network node, and the AS knows to try an address in the circuit-switched domain. This generic address is storable in memory.

In this implementation, if the network node receives a SIP 3xx provisional response and contains a contact address that is known to indicate to try an alternative domain, then the access server, or other network node, tries to resend the SIP message. The SIP AS, e.g., consults with the DSF to establish whether the signaling and bearer can be established over the same transport, such as the circuit-switched domain. If the signaling and bearer can be established on the same signaling path, then the session is routed to an SIP element, such as a media gateway, that can route the session over that bearer. In order to try and route the session to the media gateway, the SIP AS, e.g., includes, in the accept contact header, a feature tag indicating that circuit-switched to domain should be used for signaling and media. In another embodiment the SIP AS further obtains a routing number to direct the signaling and media.

Figure 6:
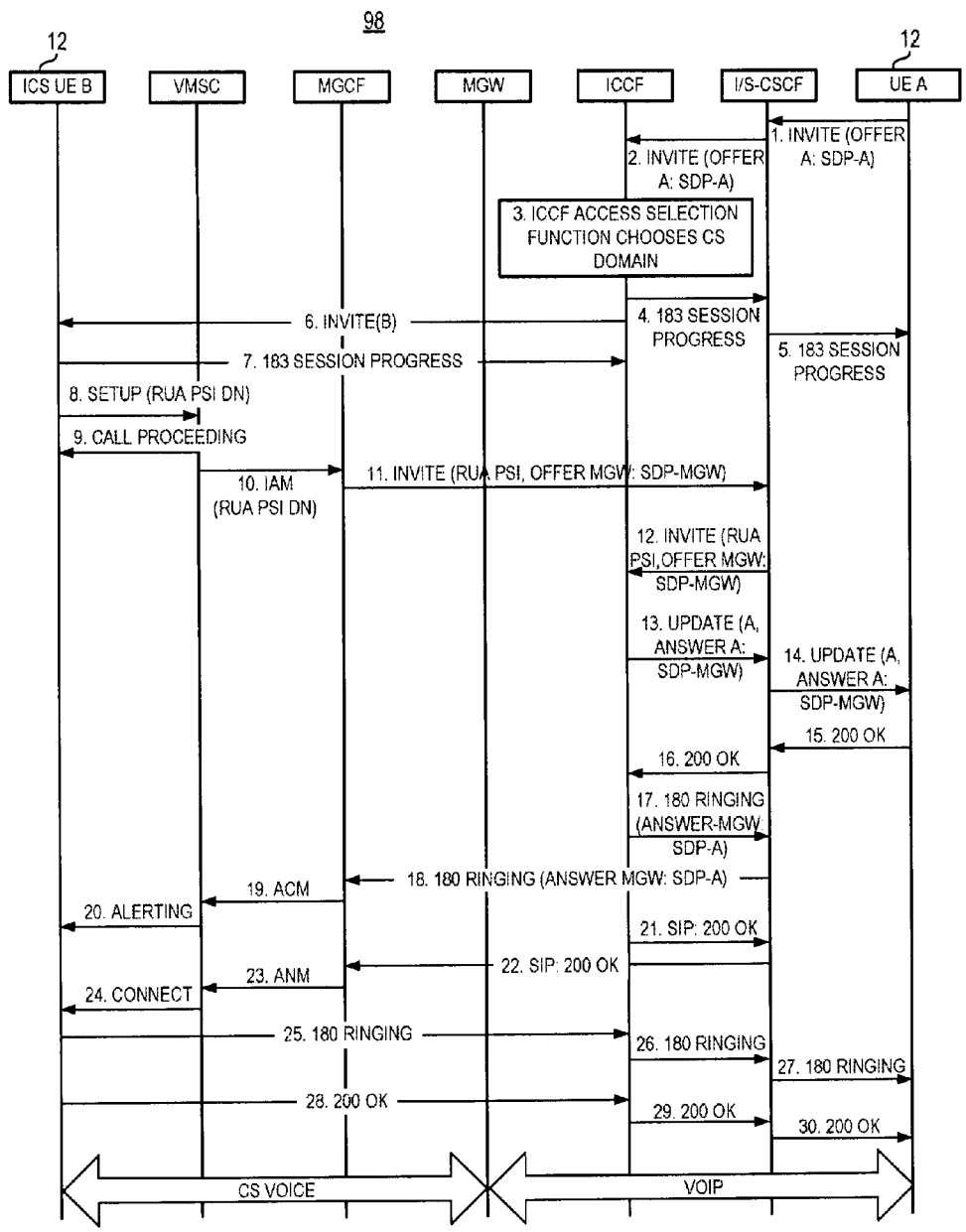
FIG. 6 illustrates a message sequence diagram representative of exemplary signaling generated during operation of an embodiment of the present disclosure.

FIG. 6 illustrates a message sequence diagram, shown generally at 98, representative of exemplary signaling generated during operation of a communication system, such as the radio communication system shown in FIG. 1. Here, a communication session is intended between a set of UEs 16, here a UE A and an ICS UE B, The network is shown to include an US-CSCF, an ICCF, an MGW, an MGCF, and a VMSC. These entities are, in conventional manner, positioned, e.g., at the network 16, shown in FIG. 1. In an exemplary implementation, the set-up signal, indicated as signal 8 in the diagram, the UE includes information in the UUS1 in the set-up to indicate that the Gm interface is not available. In one implementation, at the network, the SIP AS receives an INVITE message, inside of which is a UUS1 that carries an indication that the Gm interface is no longer available. The SIP AS assumes that the UE no longer has DTM capability.

In another implementation, the SIP AS expects to gate a 180 Ringing back option at the segment 26, but it does not. In addition, the SIP AS does not receive any other signaling to indicate that the UE has dropped the call, per sending out of the message 22, shown in FIG. 6 to be an SIP 200 OK message. The SIP AS assumes that the UE no longer has DTM capability.

Figure 7:
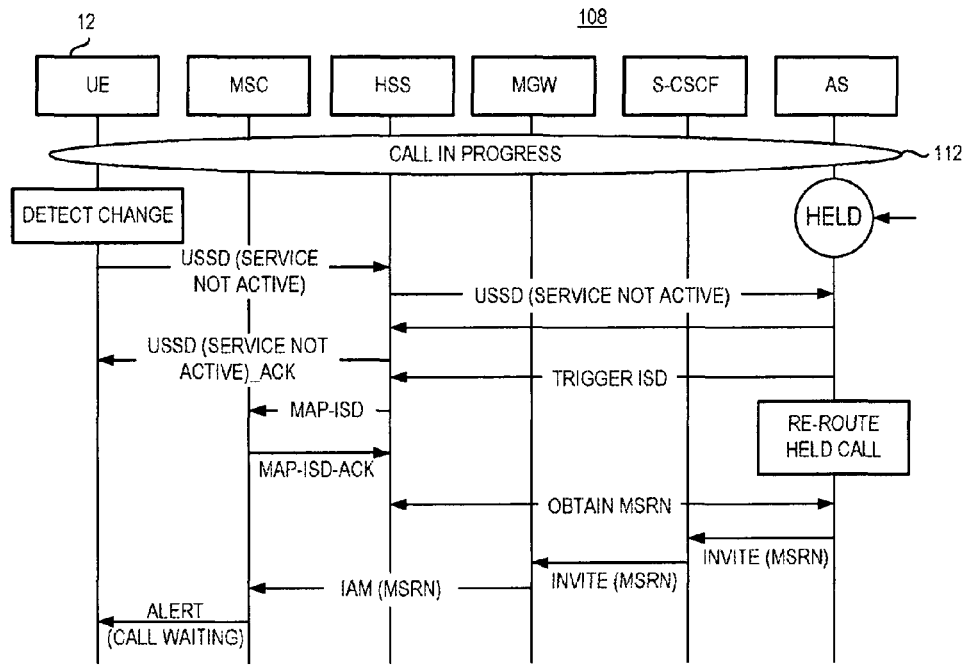
FIG. 7 illustrates another message sequence diagram, also representative of exemplary signaling generated during operation of an embodiment of the present disclosure.

FIG. 7 illustrates a message sequence diagram 108 representative of exemplary operation in a scenario in which the UE 12 is engaged in a session, as indicated by the block 112. The UE is engaged in a session and here detects a RAT or cell change that indicates that the service, e.g., an ICS, can not be offered any more. The UE sends a message, e.g., a USSD, UUS (user to user signaling) or an SMS, or other message, to the network to indicate that the Gm interface has been lost. The UE no longer uses SIP/XCAP messages to control in-call services, and instead reverts to a pre-ICS-method, supplementary service control in 3GPP TS 24.08x and 3GPP TS 24.09x definitions. The service not active indication is, e.g., a location update or attach message, or is tunneled in the USSD, UUS, SMS, etc., message. The receipt of the location update informs the network node, e.g., the ICS AS or an enhanced MSC server for ICS that the Gm interface is not available. The UE includes its IMSI as the ID of the UE. As shown in the diagram, the HSS receives the message and sends it on to the SCC AS.

Figure 8:
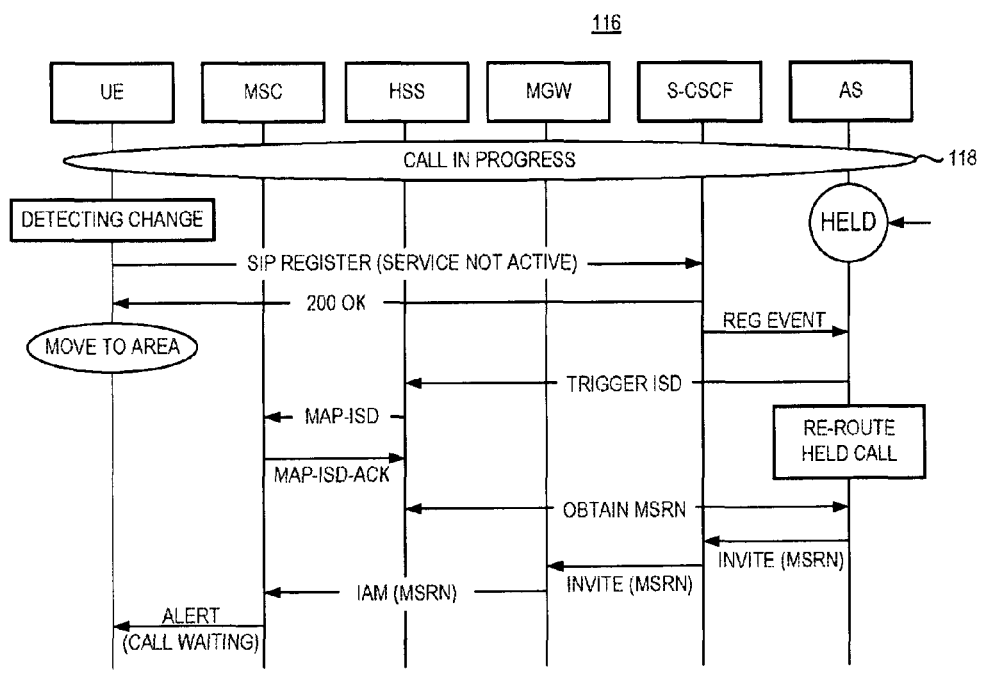
FIG. 8 also illustrates a message sequence diagram, representative of exemplary operation of an embodiment of the present disclosure.

FIG. 8 illustrates a message sequence diagram 116, also representative of exemplary signaling when the UE is engaged in a session, indicated by the call in progress block 118 in the diagram. Here, if the UE detects that a communication handover is needed and that further, the target cell/RAT does not fully support the ongoing service, e.g., ICS, then the UE generates a SIP REGISTER message and sends the message to the network. The SIP REGISTER indicates that a service is not longer active; alternately, if no indication or token is included, its absence is an indication that the service is not available. This, in turn, causes a REG EVENT to be sent to the network node, the access server (AS). The UE then moves to the area, indicated by the block 122, and the UE no longer has DTM and/or UTRAN capability.

Upon receipt at the SIP access server, of the USSD or REG EVENT that indicates the service is not supported, the access server, in one implementation, triggers the HSS to download pre-ICS-supplementary services into the MSC. If a call is on hold at the SIP AS, the call is re-routed to the UE where the MSC performs call waiting and hold operations.

In an alternate implementation, the subscriber has call waiting, hold, and multi-party already provisioned at the HSS, which is downloaded to the MSC. As all supplementary services are hosted in an IMS network, normally, these services are not invoked.

When the UE is no longer involved in an active session, including a call on hold, the UE performs an IMS REGISTRATION to inform the access server that the service is no longer available unless the UE has already transitioned back to an area that supports the service. For example, if a back to UTRAN or DTM is available, the UE will perform an IMS REGISTRATION to inform the access server that the service has returned.

If the UE is engaged in a session and another session arrives at the network for the UE and, additionally, the SIP UA is known not to have a DTM/UTRAN capability available, the session is routed to a circuit-switched domain. Call waiting is invoked in the circuit-switched domain. Future session requests with the UE are routed to the circuit-switched domain until such time as the UE signals that ICS is again available to the UE.

In one implementation, if the UE is in a cell that supports DTM or the necessary functionality for operator policy and then intends to move into a cell that does not support DTM or the necessary functionality for operator policy, and certain supplementary services are currently invoked, such as call hold, the UE generates signaling. Namely, the UE signals to the IMS network by way of, e.g., an SIP message, USSD message, an SMS message, etc. to indicate that the DTM or necessary functionality for operator policy is not longer supported at the UE. The UE reverts to a non-ICS operating mode. If the UE wants to perform a supplementary service operation, such as call hold, a multi-party session, etc., legacy signaling, pre-ICS, is utilized.

Figure 9:
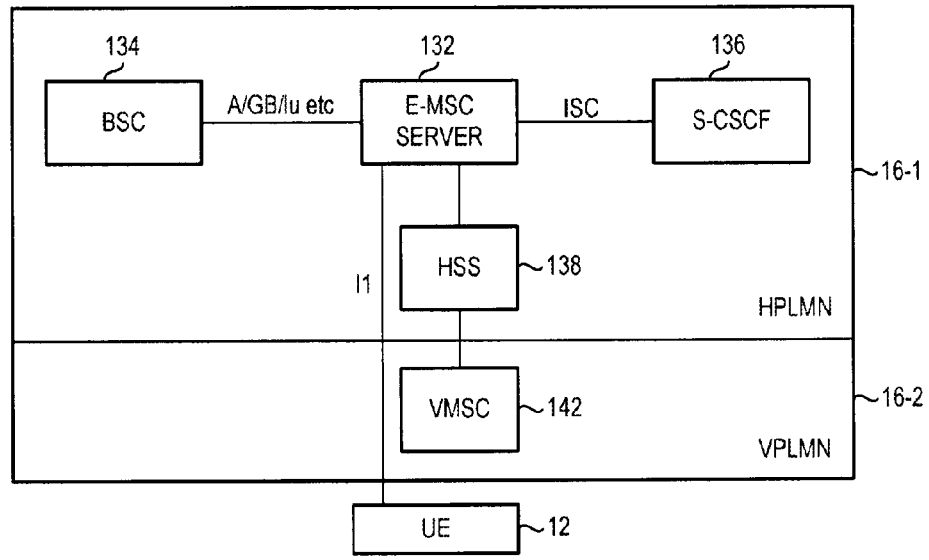
FIG. 9 illustrates a functional representation of a portion of a network part of the radio communication system shown in FIG. 1.

FIG. 9 illustrates the general architecture of the HPLMN 16-1 and the VPLMN 16-2 forming part of the network of the communication system 10 shown in FIG. 1, according to an embodiment of the present disclosure. The UE 12 is also shown in the figure, connected to an E-MSC server 132 by an I1 connection. The server 132 is here shown to be coupled to a BSC 134, to an S-CSCF 136, and to an HSS 138. The VPLMN is shown to include a VMSC 142 that is coupled to the HSS.

The architecture shown in FIG. 9 is representative of an architecture arrangement utilized to tunnel legacy messages. The E-MSC server acts as a B2BUA ICS server in that the mobile switching center recognizes messages that come from the HSS and forwards such messages on to the S-CSCF as SIP messages.

In one embodiment of the present disclosure, legacy messages are encapsulated. The architecture set forth in FIG. 9 provides for the communication of such encapsulated legacy messages. In one exemplary manner, encapsulation is provided when a UE is required to use the I1 interface to which the UE has access to pre-ICS service control. Such messages include those defined in the 3GPP TS 24.008, 3GPP TS 24.08x, and 3GPP TS 24.09x documents. In the architecture shown in FIG. 9, the server in the HPLMN 16-2 performs interworking between 3GPP TS 24.008 messages and the SIP. An analogous procedure is utilized in the architecture shown in FIG. 10, which includes an ICS AS, or an implementation in which the MSC server of the architecture shown in FIG. 9 is enhanced for ICS.

An operating principle is that messages, which use the H reference point, go from the E-MSC server 132 or the ICS AS as TS 24.008 messages tunneled in USSD. One exemplary protocol includes: facility (invoke=operation (3GPP TS 24.008 message)) and facility (invoke=operation (supplementary service code, parameter (invoke=operation (supplementary service code, parameter (s))))). And, for the message return, an exemplary protocol comprises: facility (return result=operation (TS 24.008 message)) and facility (return result=operation (supplementary service code, parameter (invoke=operation (supplementary service code, parameter (s))))).

Figure 10:
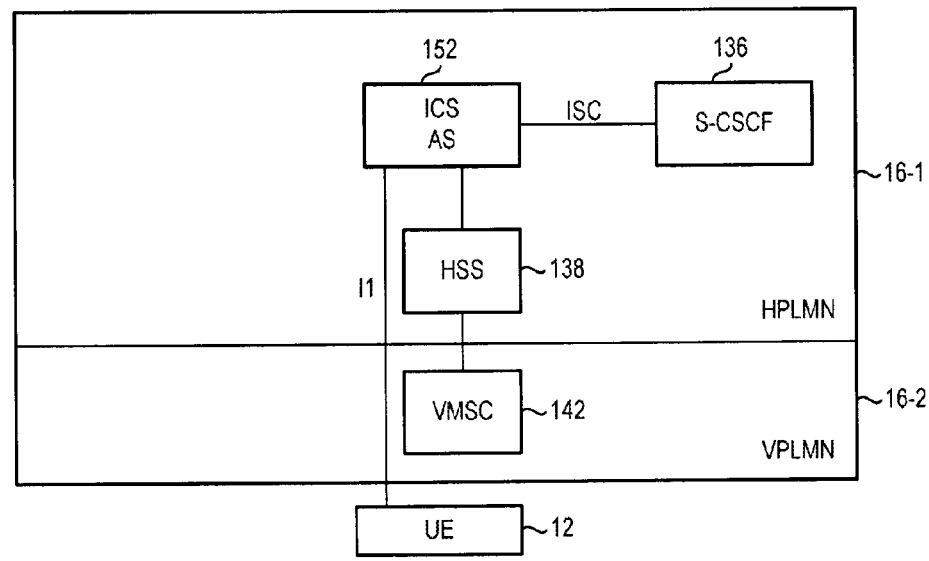
FIG. 10 illustrates another functional representation of a network that forms part of the radio communication system shown in FIG. 1 in another implementation.

FIG. 10 illustrates the architecture of an alternate embodiment. In this embodiment, the ICS-AS 152 provides the functionality of an E-MSC server. The access server 152 is again shown to be coupled to an S-CSCF 136 and to an HSS 138 and to the UE 12 by way of the I1 interface.

Figure 11:
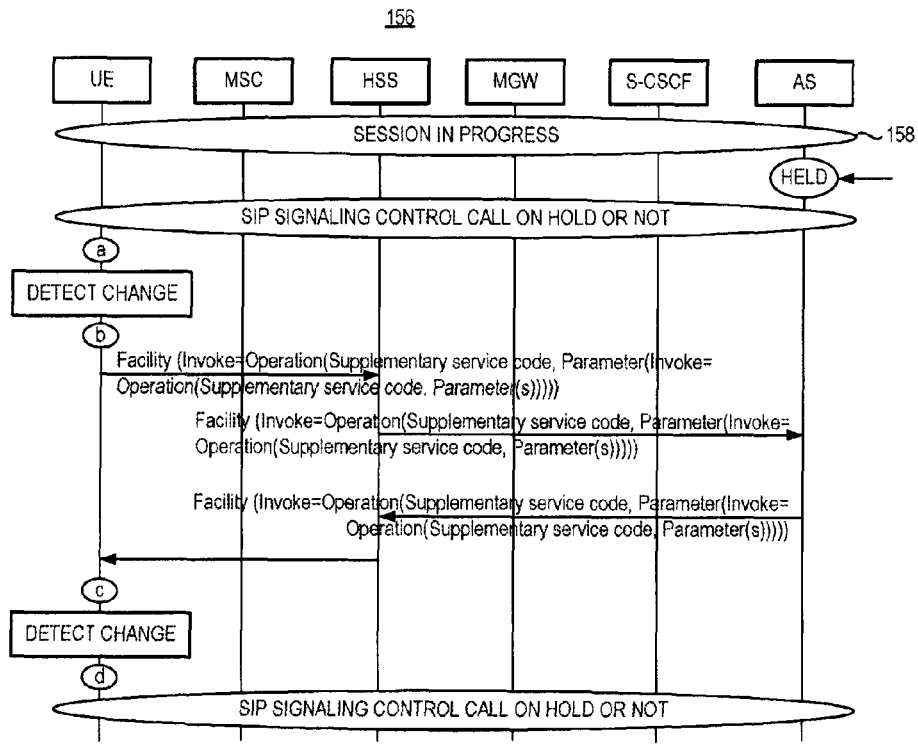
FIG. 11 illustrates a message sequence diagram representative of signaling generated during operation of an embodiment of the present disclosure.
Figure 21:
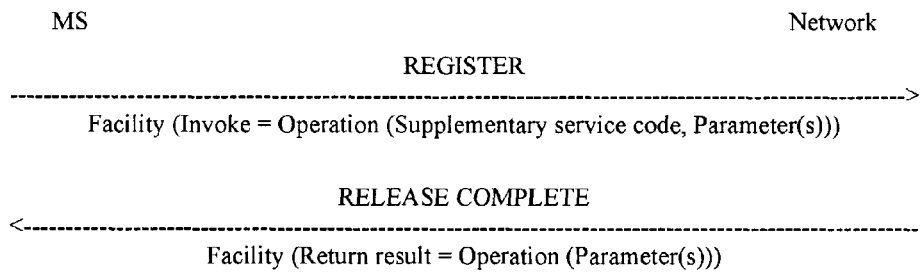
FIG. 21 illustrates an example signal exchange between a UE and a network.

FIG. 11 illustrates a message sequence diagram 156 illustrating signaling generated pursuant to tunneling of SS messages. A session is in progress, as indicated by the block 158 extending between an access server and the UE 12. If the DTM, or other necessary functionality per operator policy is not supported and is detected by the UE, the UE reverts to using a USSD message to control the services in the IMS network. The UE informs the SIP AS at times indicated at a, b, c, and d of the change in signaling that the UE shall use. The procedures at times a and b include, e.g., the aforementioned procedures. The USSD messages are constructed to contain 3GPP TS24.08x and 3GPP TS24.09x contents. The HSS receives the USSD and analyzes the message. The HSS determines that the message is for the ICS AS. If additional processing is required, a flag indicating the requirement is included in a supplementary service message. FIG. 21 illustrates the exemplary signal exchange between the UE and the network including a parameter that is, e.g., (invoke equals operation (supplementary service code, parameter(s))).

At times c and d shown in FIG. 11, the UE informs the network that Gm is again being used. At step c a USSD-type scheme is utilized, and at step d, a SIP-based scheme is utilized, such as refresh the SIP REGISTER.

For example, if the UE has a call on hold, as shown, when the UE wants to invoke bringing the call off-hold, the UE sends an appropriate call hold supplementary service message, per 3GPP TS24.08x/09x, which is then encapsulated into a USSD message and sent to the network.

In one implementation, an enhanced MSC server for ICS services is utilized and the USSD that tunnels the SS message is converted into an SIP message, and an MMTEL TS 3GPP 23.273/24.373 message is executed.

In another implementation, in order to support a quick introduction of I1 protocols, 3GPP TS 24.008 messages are tunneled from the ICS AS to the UE, and vice versa. Tunneling of 3GPP TS 24.008 messages comprises packing the 3GPP TS 24.008 message into a USSD handler. More generally, session control signaling is inserted into a transport envelope that is sent from the UE to the network. The transport envelope is of any of various types including, e.g., USSD, SMS, IP, SIP, SIP MESSAGE, etc.

Figure 12:
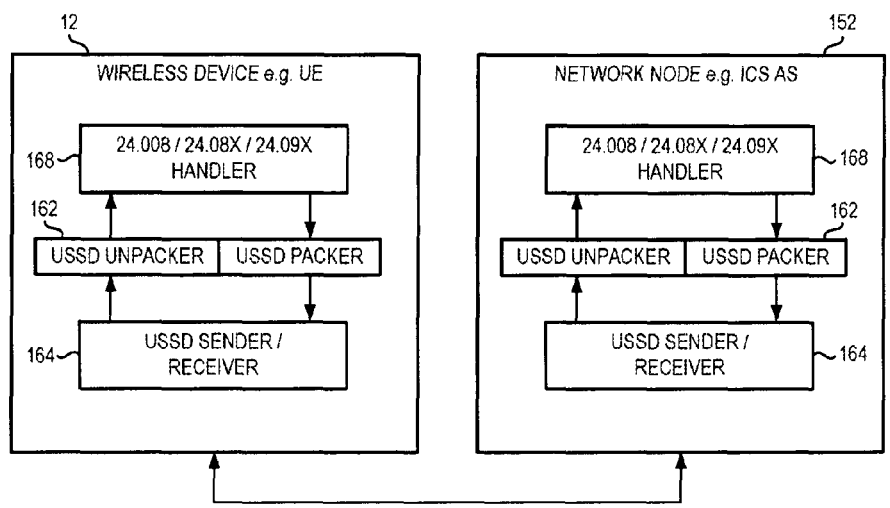
FIG. 12 illustrates a functional representation of the wireless device and a network node forming part of the radio communication system shown in FIG. 1.

FIG. 12 illustrates exemplary architecture of the UE 12 and the ICS AS 152, or other network node. In this example, the UE forms a SIP UA and intends to send a session management message, such as a 3GPP TS 24.008 message, to the network. The UE takes the session management message and puts it into a transport envelope or tunnel protocol. In FIG. 12, this functionality is carried out by a USSD packer/unpacker 162. The packer 162 takes the message and ensures that the message has the necessary information for the required application, e.g., strips IEs, adds IEs, etc. The packer 162 also sets a flag in the message that identifies the message-type of the message. For example, the message forms a mobility management, call control, supplementary service, etc. message. The packer 162 then provides the message to the USSD application, here indicated at the USSD sender/receiver 164, which provides the tunneling protocol and causes sending of the message to the network.

The network node 152 receives the USSD message at the USSD receiver 164, and determines that the message is for the application, and provides the message to the appropriate USSD unpacker 162. The unpacker removes the information elements to be used by the application and sends the message to the 3GPP TS 24.008 handler engine 168. The engine 168 operates in a manner such that the handler/engine knows that the message is for a specific application and knows what to invoke.

Figure 13:
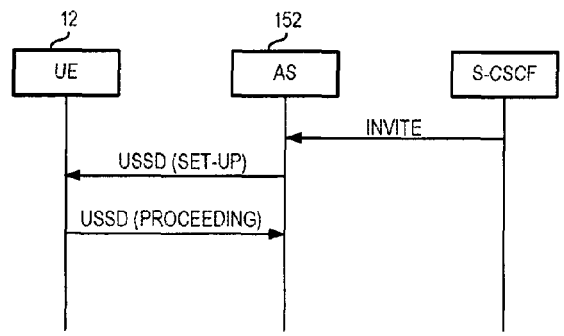
FIG. 13 illustrates a message sequence diagram representative of signaling generated between network entities and the wireless device forming part of the radio communication system shown in FIG. 1.

FIG. 13 illustrates a message sequence diagram 172 representative of signaling pursuant to an SIP implementation, here showing signaling between an S-CSCF, the access server 152, and the UE 12. The 3GPP TS 24.008/24.08x/0.9x messages are tunneled in SIP message with the R-URI comprising, e.g., the ICS AS PSI DN.

Figure 22:
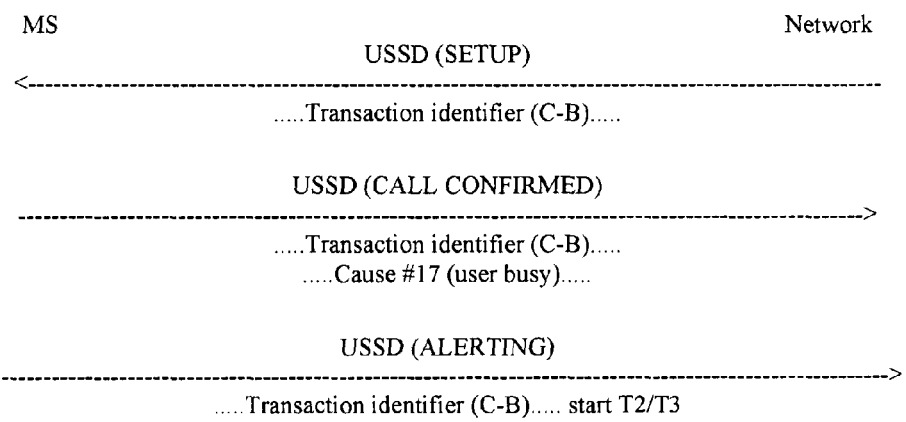
FIGS. 22-27 illustrate exchanges of messaging between a UE and a network.

The examples of FIG. 22 show exemplary, supplementary service types.

Figure 23:
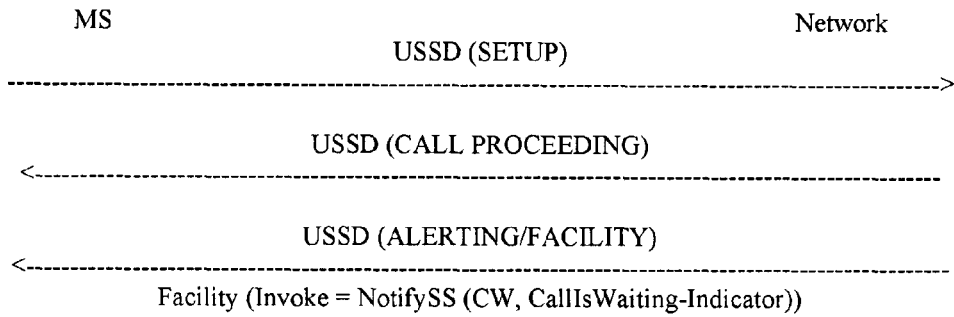

The SETUP message includes a "signal information" element with a value, such as number 7, to indicate call waiting with tone on, as shown in FIG. 23. This is used by the UE to generate an appropriate call waiting indication.

This example comprises a call indication to the mobile station on arrival of an incoming call and call confirmation from the mobile station.

Figure 24:
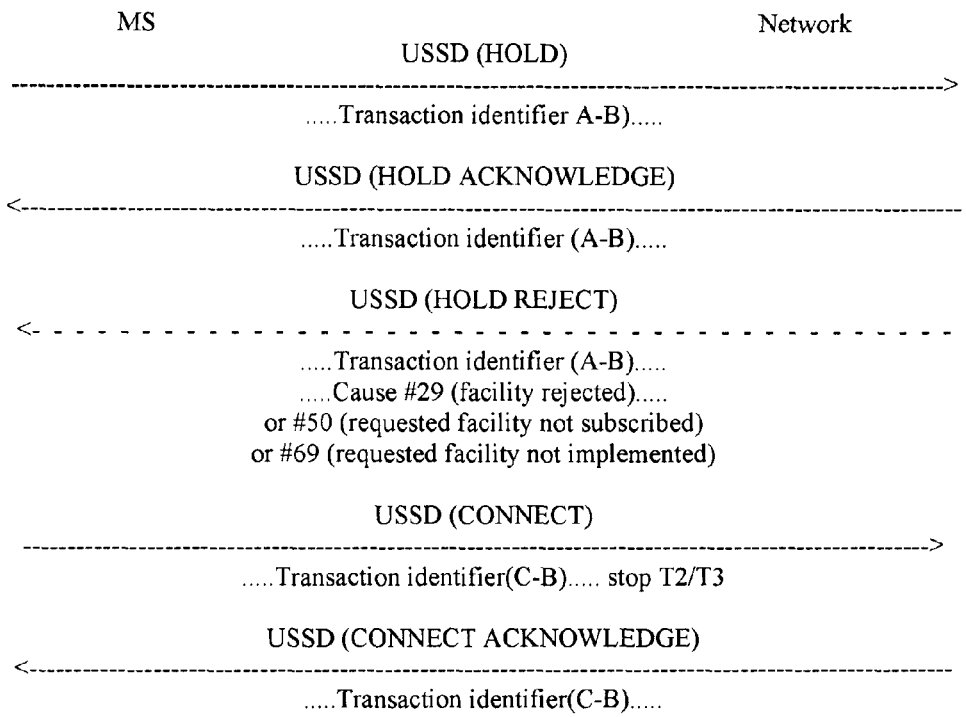

The examples of FIG. 24 are representative of existing call on hold and acceptance of a waiting call by the UE.

Figure 25:
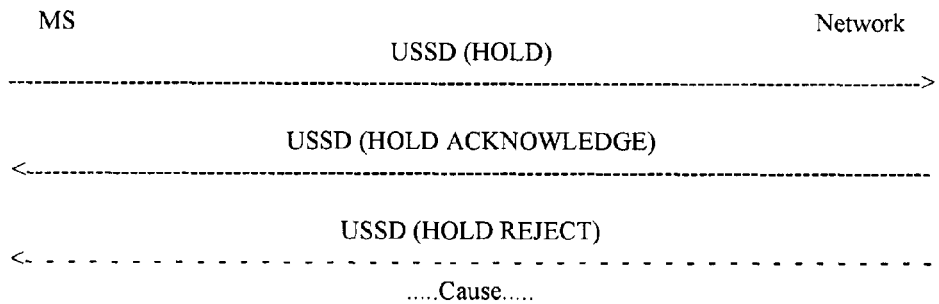

The example of FIG. 25 is representative of invocation of a call hold. If the network receives a non-zero SS screening indicator from a UE, the network sends a notification to the UE to indicate that the call has been placed on hold. If the network does not receive a non-zero SS screening indicator from the UE, the network does not send a notification.

Figure 26:
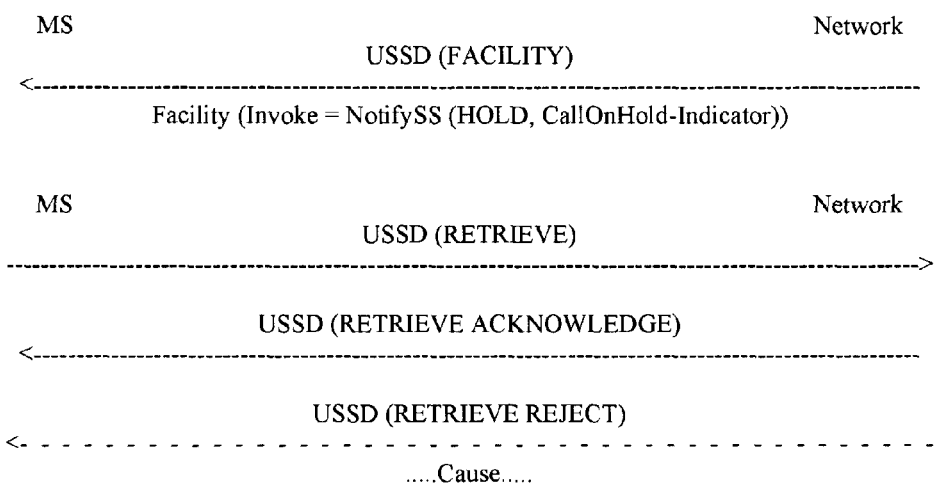

The example of FIG. 26 is of notification that the held call is to be retrieved, using the transaction identifier of the held call, by the served UE.

Figure 27:
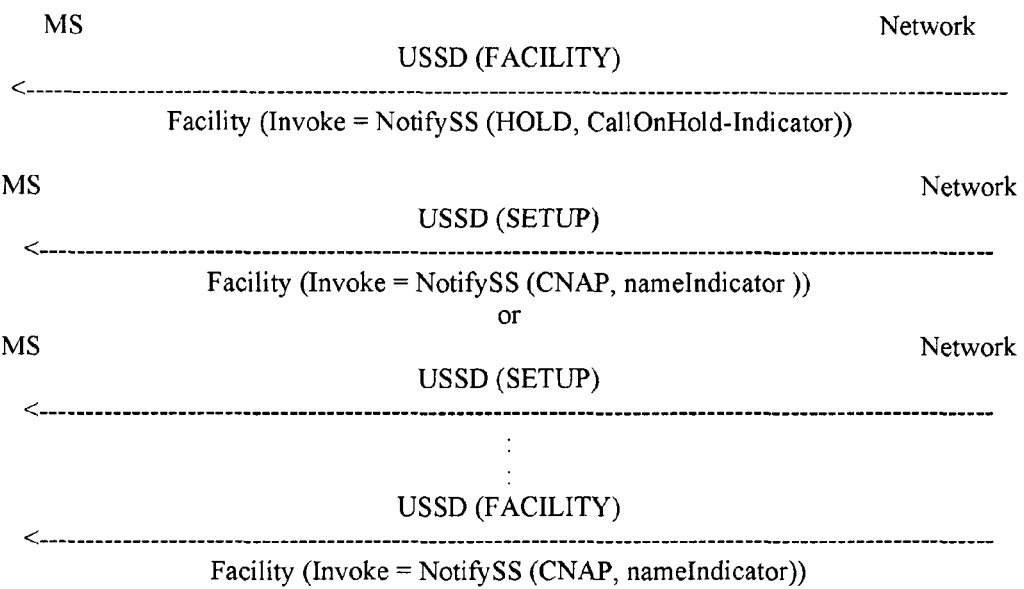

The example of FIG. 27 is of signaling representative of notification to a held UE that the held call is to be retrieved or has been retrieved. If the ICS AS receives a SIP URI that is to be sent to the UE, it includes, for instance, the SIP URI in the set-up facility CNAP information element.

In one implementation, the name indicator in the message is extended to indicate SIP URI/TEL URI that is contained in the facility element such as follows:

```
NameIndicator ::= SEQUENCE {
    callingName      [0] Name OPTIONAL,
    SIP URI          [1] Name OPTIONAL,
    ...}
```

The B party information element in the set-up message is used, in one implementation, to transport the RUI PSI DN from the network to the UE. The UE should recognize that this IE is not normally included and knows to use it for the MO set-up. This is achieved, for example, by the UE determining that the 3GPP TS 24.008 message is tunneled and the meaning of the information element is for an ICS application.

In one implementation, a call proceeding message, or other message, which is received after sending a set-up, is extended to include an E.164 information element that describes the RUA PSI DN. The following table illustrates exemplary information elements of a call proceeding message.

In one implementation, the outgoing set-up includes an SIP URI coded into an outgoing facility message. The following table and table in FIG. 28 illustrates an exemplary coding in such a message.

| IEI | Information element | Type/Reference | Presence | Format | Length |
|---|---|---|---|---|---|
|  | Call control Protocol discriminator | Protocol discriminator 10.2 | M | V | ½ |
|  | Transaction identifier | Transaction identifier 10.3.2 | M | V | ½ |
|  | Setup Message type | Message type 10.4 | M | V | 1 |
| D- | BC repeat indicator | Repeat indicator 10.5.4.22 | C | TV | 1 |
| 04 | Bearer capability 1 | Bearer capability 10.5.4.5 | O | TLV | 3-16 |
| 04 | Bearer capability 2 | Bearer capability 10.5.4.5 | O | TLV | 3-16 |
| 1C | Facility | Facility 10.5.4.15 | O | TLV | 2-? |

```
NotifySS-Arg ::= SEQUENCE{
    ss-Code                  [1]   SS-Code OPTIONAL,
    ss-Status                [4]   SS-Status OPTIONAL,
    ss-Notification          [5]   SS-Notification OPTIONAL,
    callIsWaiting-Indicator  [14]  NULL OPTIONAL,
    callOnHold-Indicator     [15]  CallOnHold-Indicator OPTIONAL,
    mpty-Indicator           [16]  NULL OPTIONAL,
    cug-Index                [17]  CUG-Index OPTIONAL,
    clirSuppressionRejected  [18]  NULL OPTIONAL,
    ... ,
    ect-Indicator            [19]  ECT-Indicator OPTIONAL,
    nameIndicator            [20]  NameIndicator OPTIONAL,
    ccbs-Feature             [21]  CCBS-Feature OPTIONAL,
    alertingPattern          [22]  AlertingPattern OPTIONAL,
    multicall-Indicator      [23]  Multicall-Indicator OPTIONAL,
    URI-Indicator            [24]  URI-Indicator OPTIONAL)
    URI-Indicator ::= SEQUENCE {
        SIP URI      [0] URISET OPTIONAL,
        ...}
    URISet ::= SEQUENCE {
        dataCodingScheme   [0] USSD-DataCodingScheme,
        lengthInCharacters [1] INTEGER,
        nameString         [2] USSD-String,
        ...}
```

| IEI | Information element | Type/Reference | Presence | Format | Length |
|---|---|---|---|---|---|
|  | Call control protocol discriminator | Protocol discriminator 10.2 | M | V | 1/2 |
|  | Transaction identifier | Transaction identifier 10.3.2 | M | V | 1/2 |
|  | Call proceeding message type | Message type 10.4 | M | V | 1 |
| D- | Repeat Indicator | Repeat Indicator 10.5.4.22 | C | TV | 1 |
| 04 | Bearer capability 1 | Bearer capability 10.5.4.5 | O | TLV | 3-16 |
| 04 | Bearer capability 2 | Bearer capability 10.5.4.5 | O | TLV | 3-16 |
| 1C | Facility | Facility 10.5.4.15 | O | TLV | 2-? |
| 1E | Progress indicator | Progress indicator 10.5.4.21 | O | TLV | 4 |
| 8- | Priority granted | Priority Level 10.5.1.11 | O | TV | 1 |
| 2F | Network Call Control RUA PSI DN | Network Call Control cap. Calling party Number 10.5.4.9 section TS 24.008 | O M | TLV TLV | 3 3-19 |

Coding of a USSD is also provided in one implementation. The general coding includes, the following:

| Protocol Version | Protocol Type | Length | Facility |
|---|---|---|---|
| Indicates the version of the tunneling protocol | Indicates if the tunneling contains Mobility management Call Control SS messages SIP Messages ICS Call control protocol | Length of information | Facility Message per below |

In one implementation, facility coding includes: facility (invoke=operation (supplementary service code, parameter (invoke=operation (supplementary service code, parameter (s))))), and facility (return result=operation (supplementary service code, parameter (invoke=operation (supplementary service code, parameter (s))))). Alternately, facility coding comprises: facility (invoke=operation (supplementary service code, parameter (supplementary service code, parameter (s)))), and facility (return result=operations (supplementary service code, parameter (supplementary service code, parameter (s)))).

A first operation SS code, in an exemplary implementation, is USSD formatted, and the second operational code is selected from a table, such as the following:

registerSS
eraseSS
activateSS
deactivateSS
interrogateSS
registerPassword
getPassword
forwardCheckSS-Indication
processUnstructuredSS-Request
unstructuredSS-Request
unstructuredSS-Notify
forwardChargeAdvice
notifySS
forwardCUG-Info
buildMPTY
holdMPTY
retrieveMPTY
splitMPTY
explicitCT
accessRegisterCCEntry
eraseCCEntry
callDeflection
userUserService
lcs-LocationNotification
lcs-MOLR
lcs-AreaEventRequest
lcs-AreaEventReport
Lcs-AreaEventCancellation Examples of messages are as follows:

```
ERASE CC-ENTRY
processUnstructuredSS-Request OPERATION ::= {
    ARGUMENT        SEQUENCE {
        ussd-DataCodingScheme   OCTET STRING ( SIZE( 1 ) ),
        ussd-String             OCTET STRING (
            eraseCC-Entry OPERATION ::= {
                ARGUMENT        SEQUENCE {
                    ss-Code   [0] IMPLICIT OCTET STRING ( SIZE( 1 ) ),
                    ccbs-Index [1] IMPLICIT INTEGER ( 1 .. 5 ) OPTIONAL,
                    )
        alertingPattern     OCTET STRING ( SIZE( 1 ) ) OPTIONAL,
        msisdn              [0] IMPLICIT OCTET STRING ( SIZE( 1 .. 20 ) ) ( SIZE( 1 .. 9 ) ) OPTIONAL}
        RESULT          SEQUENCE {
            ussd-DataCodingScheme   OCTET STRING ( SIZE( 1 ) ),
            ussd-String     OCTET STRING (
                            SEQUENCE {
                                ss-Code      [0] IMPLICIT OCTET STRING ( SIZE( 1 ) ),
                                ss-Status    [1] IMPLICIT OCTET STRING ( SIZE( 1 ) ) OPTIONAL,
                                ... }
                            ERRORS      {
                                systemFailure |
                                dataMissing |
                                unexpectedDataValue |
                                callBarred |
                                illegalSS-Operation |
                                ss-ErrorStatus }
                                        ),
            ... }
        ERRORS      {
            systemFailure |
            dataMissing |
            unexpectedDataValue |
            unknownAlphabet |
            callBarred }
        CODE    local       : 59
Register SS
processUnstructuredSS-Request OPERATION ::= {
    ARGUMENT        SEQUENCE {
        ussd-DataCodingScheme   OCTET STRING ( SIZE( 1 ) ),
        ussd-String     OCTET STRING (
                registerSS OPERATION ::= {
                    ARGUMENT        SEQUENCE {
                        ss-Code             OCTET STRING ( SIZE( 1 ) ),
                        basicService            CHOICE {
                            bearerService   [2] IMPLICIT OCTET STRING ( SIZE( 1 ) ),
```

```
                    teleservice      [3] IMPLICIT OCTET STRING ( SIZE( 1 ) )} OPTIONAL,
                forwardedToNumber        [4] IMPLICIT OCTET STRING ( SIZE( 1 .. 20 ) ) OPTIONAL,
                forwardedToSubaddress  [6] IMPLICIT OCTET STRING ( SIZE( 1 .. 21 ) )
            OPTIONAL,
                noReplyConditionTime   [5] IMPLICIT INTEGER ( 5 .. 30 ) OPTIONAL,
                ... ,
                defaultPriority        [7] IMPLICIT INTEGER ( 0 .. 15 ) OPTIONAL,
                nbrUser                [8] IMPLICIT INTEGER ( 1 .. 7 ) OPTIONAL,
                longFTN-Supported      [9] IMPLICIT NULL OPTIONAL}
                                )
    alertingPattern    OCTET STRING ( SIZE( 1 ) ) OPTIONAL,
    msisdn           [0] IMPLICIT OCTET STRING ( SIZE( 1 .. 20 ) ) ( SIZE( 1 .. 9 ) ) OPTIONAL}
RESULT    SEQUENCE {
    ussd-DataCodingScheme   OCTET STRING ( SIZE( 1 ) ),
    ussd-String            OCTET STRING (
                    CHOICE {
                        forwardingInfo    [0] IMPLICIT SEQUENCE {
                            ss-Code           OCTET STRING ( SIZE( 1 ) ) OPTIONAL,
                            forwardingFeatureList SEQUENCE ( SIZE( 1 .. 13 ) ) OF
                                SEQUENCE {
                                    basicService      CHOICE {
                                        bearerService     [2] IMPLICIT OCTET STRING ( SIZE( 1 ) ),
                                        teleservice       [3] IMPLICIT OCTET STRING ( SIZE( 1 ) )} OPTIONAL,
                                    ss-Status             [4] IMPLICIT OCTET STRING ( SIZE( 1 ) ) OPTIONAL,
                                    forwardedToNumber     [5] IMPLICIT OCTET STRING ( SIZE( 1 .. 20 ) ) (
                        SIZE( 1 .. 9 ) ) OPTIONAL,
                                    forwardedToSubaddress  [8] IMPLICIT OCTET STRING ( SIZE( 1 .. 21 ) )
                        OPTIONAL,
                                    forwardingOptions    [6] IMPLICIT OCTET STRING ( SIZE( 1 ) )
                        OPTIONAL,
                                    noReplyConditionTime   [7] IMPLICIT INTEGER ( 5 .. 30 ) OPTIONAL,
                                    ... ,
                                    longForwardedToNumber  [9] IMPLICIT OCTET STRING ( SIZE( 1 .. 20 )
                        ) (SIZE(1 .. 15)) OPTIONAL},
                            ... },
                        callBarringInfo   [1] IMPLICIT SEQUENCE {
                            ss-Code           OCTET STRING ( SIZE( 1 ) ) OPTIONAL,
                            callBarringFeatureList SEQUENCE ( SIZE( 1 .. 13 ) ) OF
                                SEQUENCE {
                                    basicService CHOICE {
                                        bearerService   [2] IMPLICIT OCTET STRING ( SIZE( 1 ) ),
                                        teleservice     [3] IMPLICIT OCTET STRING ( SIZE( 1 ) )} OPTIONAL,
                                    ss-Status       [4] IMPLICIT OCTET STRING ( SIZE( 1 ) ) OPTIONAL,
                                    ... },
                            ... },
                        ss-Data           [3] IMPLICIT SEQUENCE {
                            ss-Code           OCTET STRING ( SIZE( 1 ) ) OPTIONAL,
                            ss-Status         [4] IMPLICIT OCTET STRING ( SIZE( 1 ) ) OPTIONAL,
                            ss-SubscriptionOption CHOICE {
                                cliRestrictionOption     [2] IMPLICIT ENUMERATED {
                                    permanent                ( 0 ),
                                    temporaryDefaultRestricted  ( 1 ),
                                    temporaryDefaultAllowed     ( 2 ) },
                                overrideCategory         [1] IMPLICIT ENUMERATED {
                                    overrideEnabled    ( 0 ),
                                    overrideDisabled   ( 1 ) }} OPTIONAL,
                            basicServiceGroupList SEQUENCE ( SIZE( 1 .. 13 ) ) OF
                                CHOICE {
                                    bearerService   [2] IMPLICIT OCTET STRING ( SIZE( 1 ) ),
                                    teleservice     [3] IMPLICIT OCTET STRING ( SIZE( 1 ) )} OPTIONAL,
                            ... ,
                            defaultPriority       INTEGER ( 0 .. 15 ) OPTIONAL,
                            nbrUser           [5] IMPLICIT INTEGER ( 1 .. 7 ) OPTIONAL}}
                        ERRORS   {
                            systemFailure |
                            dataMissing |
                            unexpectedDataValue |
                            bearerServiceNotProvisioned |
                            teleserviceNotProvisioned |
                            callBarred |
                            illegalSS-Operation |
                            ss-ErrorStatus |
                            ss-Incompatibility }
                                ),
    ... }
ERRORS      {
    systemFailure |
    dataMissing |
    unexpectedDataValue |
```

```
        unknownAlphabet |
        callBarred }
      CODE        local       : 59
EraseSS
processUnstructuredSS-Request OPERATION ::= {
  ARGUMENT        SEQUENCE {
    ussd-DataCodingScheme   OCTET STRING ( SIZE( 1 ) ),
    ussd-String    OCTET STRING (
                , eraseSS   OPERATION ::= {
                    ARGUMENT        SEQUENCE {
                      ss-Code       OCTET STRING ( SIZE( 1 ) ),
                      basicService      CHOICE {
                        bearerService   [2] IMPLICIT OCTET STRING ( SIZE( 1 ) ),
                        teleservice     [3] IMPLICIT OCTET STRING ( SIZE( 1 ) )} OPTIONAL,
                        ... ,
                                  longFTN-Supported   [4] IMPLICIT NULL OPTIONAL}
                        )
  alertingPattern     OCTET STRING ( SIZE( 1 ) ) OPTIONAL,
  msisdn              [0] IMPLICIT OCTET STRING ( SIZE( 1 .. 20 ) ) ( SIZE( 1 .. 9 ) ) OPTIONAL}
  RESULT        SEQUENCE {
    ussd-DataCodingScheme   OCTET STRING ( SIZE( 1 ) ),
    ussd-String     OCTET STRING (
                CHOICE {
                forwardingInfo      [0] IMPLICIT SEQUENCE {
                  ss-Code         OCTET STRING ( SIZE( 1 ) ) OPTIONAL,
                  forwardingFeatureList SEQUENCE ( SIZE( 1 .. 13 ) ) OF
                    SEQUENCE {
                      basicService        CHOICE {
                        bearerService     [2] IMPLICIT OCTET STRING ( SIZE( 1 ) ),
                        teleservice       [3] IMPLICIT OCTET STRING ( SIZE( 1 ) )} OPTIONAL,
                      ss-Status          [4] IMPLICIT OCTET STRING ( SIZE( 1 ) ) OPTIONAL,
                      forwardedToNumber    [5] IMPLICIT OCTET STRING ( SIZE( 1 .. 20 ) ) (
SIZE( 1 .. 9 ) ) OPTIONAL,
                      forwardedToSubaddress  [8] IMPLICIT OCTET STRING ( SIZE( 1 .. 21 ) )
OPTIONAL,
                      forwardingOptions      [6] IMPLICIT OCTET STRING ( SIZE( 1 ) ) OPTIONAL,
                      noReplyConditionTime   [7] IMPLICIT INTEGER ( 5 .. 30 ) OPTIONAL,
                      ... ,
                      longForwardedToNumber  [9] IMPLICIT OCTET STRING ( SIZE( 1 .. 20 ) ) (
SIZE(1 .. 15)) OPTIONAL},
                ... },
                callBarringInfo     [1] IMPLICIT SEQUENCE {
                  ss-Code         OCTET STRING ( SIZE( 1 ) ) OPTIONAL,
                  callBarringFeatureList SEQUENCE ( SIZE( 1 .. 13 ) ) OF
                    SEQUENCE {
                      basicService CHOICE {
                        bearerService   [2] IMPLICIT OCTET STRING ( SIZE( 1 ) ),
                        teleservice     [3] IMPLICIT OCTET STRING ( SIZE( 1 ) )} OPTIONAL,
                      ss-Status       [4] IMPLICIT OCTET STRING ( SIZE( 1 ) ) OPTIONAL,
                      ... },
                ... },
                ss-Data             [3] IMPLICIT SEQUENCE {
                  ss-Code         OCTET STRING ( SIZE( 1 ) ) OPTIONAL,
                  ss-Status       [4] IMPLICIT OCTET STRING ( SIZE( 1 ) ) OPTIONAL,
                  ss-SubscriptionOption CHOICE {
                    cliRestrictionOption   [2] IMPLICIT ENUMERATED {
                      permanent           ( 0 ),
                      temporaryDefaultRestricted   ( 1 ),
                      temporaryDefaultAllowed    ( 2 ) },
                    overrideCategory       [1] IMPLICIT ENUMERATED {
                      overrideEnabled   ( 0 ),
                      overrideDisabled   ( 1 ) }} OPTIONAL,
                  basicServiceGroupList SEQUENCE ( SIZE( 1 .. 13 ) ) OF
                    CHOICE {
                      bearerService   [2] IMPLICIT OCTET STRING ( SIZE( 1 ) ),
                      teleservice     [3] IMPLICIT OCTET STRING ( SIZE( 1 ) )} OPTIONAL,
                    ... ,
                    defaultPriority      INTEGER ( 0 .. 15 ) OPTIONAL,
                    nbrUser           [5] IMPLICIT INTEGER ( 1 .. 7 ) OPTIONAL}}
                ERRORS        {
                  systemFailure |
                  dataMissing |
                  unexpectedDataValue |
                  bearerServiceNotProvisioned |
                  teleserviceNotProvisioned |
                  callBarred |
                  illegalSS-Operation |
                  ss-ErrorStatus }
                        ),
```

```
    ... }
  ERRORS       {
    systemFailure |
    dataMissing |
    unexpectedDataValue |
    unknownAlphabet |
    callBarred }
  CODE         local       : 59
ActiviateSS
processUnstructuredSS-Request OPERATION ::= {
  ARGUMENT      SEQUENCE {
    ussd-DataCodingScheme   OCTET STRING ( SIZE( 1 ) ),
    ussd-String            OCTET STRING (
        activateSS OPERATION ::= {
          ARGUMENT       SEQUENCE {
            ss-Code          OCTET STRING ( SIZE( 1 ) ),
            basicService     CHOICE {
              bearerService  [2] IMPLICIT OCTET STRING ( SIZE( 1 ) ),
              teleservice    [3] IMPLICIT OCTET STRING ( SIZE( 1 ) )} OPTIONAL,
              longFTN-Supported  [4] IMPLICIT NULL OPTIONAL}
              )
    alertingPattern    OCTET STRING ( SIZE( 1 ) ) OPTIONAL,
    msisdn            [0] IMPLICIT OCTET STRING ( SIZE( 1 .. 20 ) ) ( SIZE( 1 .. 9 ) ) OPTIONAL}
  RESULT       SEQUENCE {
    ussd-DataCodingScheme   OCTET STRING ( SIZE( 1 ) ),
    ussd-String            OCTET STRING (
                CHOICE {
                  forwardingInfo    [0] IMPLICIT SEQUENCE {
                    ss-Code          OCTET STRING ( SIZE( 1 ) ) OPTIONAL,
                    forwardingFeatureList SEQUENCE ( SIZE( 1 .. 13 ) ) OF
                        SEQUENCE {
                          basicService        CHOICE {
                            bearerService   [2] IMPLICIT OCTET STRING ( SIZE( 1 ) ),
                            teleservice     [3] IMPLICIT OCTET STRING ( SIZE( 1 ) )} OPTIONAL,
                            ss-Status        [4] IMPLICIT OCTET STRING ( SIZE( 1 ) ) OPTIONAL,
                            forwardedToNumber    [5] IMPLICIT OCTET STRING ( SIZE( 1 .. 20 ) ) (
SIZE( 1 .. 9 ) ) OPTIONAL,
                            forwardedToSubaddress  [8] IMPLICIT OCTET STRING ( SIZE( 1 .. 21 ) )
OPTIONAL,
                            forwardingOptions      [6] IMPLICIT OCTET STRING ( SIZE( 1 ) )
OPTIONAL,
                            noReplyConditionTime   [7] IMPLICIT INTEGER ( 5 .. 30 ) OPTIONAL,
                            ... ,
                            longForwardedToNumber  [9] IMPLICIT OCTET STRING ( SIZE( 1 .. 20 )
) (SIZE(1 .. 15) ) OPTIONAL},
                      ... },
                  callBarringInfo    [1] IMPLICIT SEQUENCE {
                    ss-Code          OCTET STRING ( SIZE( 1 ) ) OPTIONAL,
                    callBarringFeatureList SEQUENCE ( SIZE( 1 .. 13 ) ) OF
                        SEQUENCE {
                          basicService CHOICE {
                            bearerService   [2] IMPLICIT OCTET STRING ( SIZE( 1 ) ),
                            teleservice     [3] IMPLICIT OCTET STRING ( SIZE( 1 ) )} OPTIONAL,
                            ss-Status        [4] IMPLICIT OCTET STRING ( SIZE( 1 ) ) OPTIONAL,
                            ... },
                      ... },
                  ss-Data           [3] IMPLICIT SEQUENCE {
                    ss-Code           OCTET STRING ( SIZE( 1 ) ) OPTIONAL,
                    ss-Status         [4] IMPLICIT OCTET STRING ( SIZE( 1 ) ) OPTIONAL,
                    ss-SubscriptionOption CHOICE {
                      cliRestrictionOption   [2] IMPLICIT ENUMERATED {
                        permanent              ( 0 ),
                        temporaryDefaultRestricted  ( 1 ),
                        temporaryDefaultAllowed   ( 2 ) },
                      overrideCategory       [1] IMPLICIT ENUMERATED {
                        overrideEnabled    ( 0 ),
                        overrideDisabled   ( 1 ) }} OPTIONAL,
                    basicServiceGroupList SEQUENCE ( SIZE( 1 .. 13 ) ) OF
                        CHOICE {
                          bearerService   [2] IMPLICIT OCTET STRING ( SIZE( 1 ) ),
                          teleservice     [3] IMPLICIT OCTET STRING ( SIZE( 1 ) )} OPTIONAL,
                        ... ,
                        defaultPriority      INTEGER ( 0 .. 15 ) OPTIONAL,
                        nbrUser            [5] IMPLICIT INTEGER ( 1 .. 7 ) OPTIONAL}}
              ERRORS       {
                systemFailure |
                dataMissing |
                unexpectedDataValue |
                bearerServiceNotProvisioned |
```

```
                teleserviceNotProvisioned |
                callBarred |
                illegalSS-Operation |
                ss-ErrorStatus |
                ss-SubscriptionViolation |
                ss-Incompatibility |
                negativePW-Check |
                numberOfPW-AttemptsViolation }
                        ),
    ... }
ERRORS      {
    systemFailure |
    dataMissing |
    unexpectedDataValue |
    unknownAlphabet |
    callBarred }
CODE        local        : 59
```

In one implementation, a general facility extension is provided to transport SIP parameters such as the following:

```
NotifySS-Arg ::= SEQUENCE{
    ss-Code                     [1]     SS-Code OPTIONAL,
    ss-Status                   [4]     SS-Status OPTIONAL,
    ss-Notification             [5]     SS-Notification OPTIONAL,
    callIsWaiting-Indicator     [14]    NULL OPTIONAL,
    callOnHold-Indicator        [15]    CallOnHold-Indicator
                                        OPTIONAL,
    mpty-Indicator              [16]    NULL OPTIONAL,
    cug-Index                   [17]    CUG-Index OPTIONAL,
    clirSuppressionRejected     [18]    NULL OPTIONAL,
    ... ,
    ect-Indicator               [19]    ECT-Indicator OPTIONAL,
    nameIndicator               [20]    NameIndicator OPTIONAL,
    ccbs-Feature                [21]    CCBS-Feature OPTIONAL,
    alertingPattern             [22]    AlertingPattern
                                        OPTIONAL,
    multicall-Indicator         [23]    Multicall-Indicator
                                        OPTIONAL,
    SIP parameters              [25]    SIP-Indicator
                                        OPTIONAL)
```

The value [25] associated with the SIP parameters, noted above, is merely exemplary. Other values can, of course, be utilized.

```
SIP-Indicator ::= SEQUENCE {
        SIP param       [0] SIPparam OPTIONAL,
        ...}
    SIPparam ::= SEQUENCE {
        dataCodingScheme    [0]     USSD-DataCodingScheme,
        lengthInCharacters          [1] INTEGER,
        nameString          [2]     USSD-String,
        ...}
```

In one implementation, the USSD string in the SIP parameter "name string" has an SIP parameter of part of an XML content encoded using a USSD data coding scheme. Exemplary codings of support of CDIV modifications include:

```
NotifySS-Arg ::= SEQUENCE{
    ss-Code                     [1]     SS-Code OPTIONAL,
    ss-Status                   [4]     SS-Status OPTIONAL,
    ss-Notification             [5]     SS-Notification OPTIONAL,
    callIsWaiting-Indicator     [14]    NULL OPTIONAL,
    callOnHold-Indicator        [15]    CallOnHold-Indicator
                                        OPTIONAL,
    mpty-Indicator              [16]    NULL OPTIONAL,
    cug-Index                   [17]    CUG-Index OPTIONAL,
    clirSuppressionRejected     [18]    NULL OPTIONAL,
    ... ,
    ect-Indicator               [19]    ECT-Indicator OPTIONAL,
    nameIndicator               [20]    NameIndicator OPTIONAL,
    ccbs-Feature                [21]    CCBS-Feature OPTIONAL,
    alertingPattern             [22]    AlertingPattern OPTIONAL,
    multicall-Indicator         [23]    Multicall-Indicator
                                        OPTIONAL,
    SIP Notification            [25]    SIP-Notification OPTIONAL)
    SIP- Notification ::= SEQUENCE {
        SS-Notification    [0]    SS-Notification
        Reason        [0] Reason OPTIONAL,
        ...}
    Reason ::= SEQUENCE {
        dataCodingScheme    [0]    USSD-DataCodingScheme,
        lengthInCharacters         [1] INTEGER,
        nameString          [2]    USSD-String,
        ...}
SS-Notification ::= OCTET STRING (SIZE (1))
--      Bit  8 7 6 5 4   00000   (Unused)
--      Bit 3   Call is forwarded indication to A-subscriber
--              (calling subscriber)
--      0       No information content
--      1       Outgoing call has been forwarded to C
--      Bit 2   Call is forwarded indication to B-subscriber
--              (forwarding subscriber)
--      0       No information content
--      1       Incoming call has been forwarded to C
--      Bit 1   Call is forwarded indication to C-subscriber
--              (forwarded-to subscriber)
--      0       No information content
--      1       Incoming call is a forwarded call
```

In another implementation, if the capability of supporting ICS per operator policy is about to be lost, operator policy also defines that whether to release held calls and any other sessions that require signaling while in the session. The operator policy is, for example defined per VCC or is a new policy, provisioned in memory of the UE. The memory is of any of various types, such as a PC card, a compact flash 1 or 2 card, a smart media card, a memory stick, a memory stick duo, a memory stick pro duo, a memory stick pro-HG duo, a memory stick micro M2, a multimedia card, a secure digital card, an SxS card, a universal flash storage, a mini SD card, a micro SD card, a xD-picture card, an intelligent stick, a serial flash module, a micro card, an NT card, or any other internal or external memory including, also, a UICC, a (U)SIM card, and an R-UIM card. In one implementation, the memory is provided with the capability to read, write, interrogate, activate, and deactivate elements in the memory. And, in one implementation, the UE also is capable of imaging the memory-stored information in order more quickly to access the information, to modify the memory and then update the removal memory, etc. In an alternate implementation, the change of the contents of the removal memory is directly made.

In operation of various embodiments of the present disclosure, a media feature-tag of feature-tag name: g.3GPP.DTM is utilized with ASN.1 identifier: 1.3.6.1.8.2.1. This feature-tag indicates that the UE has DTM connectivity with the network. Boolean values are, for example, used in a communications application, for describing the capabilities of a device, such as a phone or PDA, to, e.g., indicate that the phone supports and that the networks also supports DTM.

Also in operation of an exemplary embodiment of the present disclosure, a media feature-tag G.3GPP.NO-DTM is utilized with an ASN.1 identifier: 1.3.6.1.8.2.1. This feature-tag indicates that the UE has DTM capability but that the network does not support DTM. Again, Boolean values are used with this feature-tag. The feature-tag is used, e.g., for describing the capabilities of the UE, implemented as a phone or PDA, and is used, e.g., to indicate that a phone supports DTM but that the network does not. Further in operation of an embodiment of the present disclosure, a media feature-tag G.3GPP.ICS is utilized with an ASN.1 identifier: 1.3.6.1.8.2.1. This feature-tag indicates that the device is ICS capable and can operate in an ICS mode. Bullion values are used with the feature-tag. The feature-tag is used, e.g., in a communications application for describing the capabilities of a device, such as a phone or PDA, e.g., to indicate that the UE supports ICS and that the network supports the necessary functionality to support ICS. A GPRS cell options information element is defined in an embodiment of the present disclosure. This information element is used to control a set of cell options related to GPRS. The information element provides for inclusion of a nested extension bit information element to allow future extension of cell option parameters. An exemplary GPRS cell options information is as follows:

```
< GPRS Cell Options IE > ::=
    < NMO : bit (2) >
    < T3168 : bit (3) >
    < T3192 : bit (3) >
    < DRX_TIMER_MAX : bit (3) >
    < ACCESS_BURST_TYPE : bit >
    < CONTROL_ACK_TYPE : bit >
    < BS_CV_MAX : bit (4) >
    { 0 | 1   < PAN_DEC : bit (3) >
              < PAN_INC : bit (3) >
              < PAN_MAX : bit (3) > }
    -- Optional extension information:
    { 0 | 1   <Extension Length : bit (6)>
              < bit (val(Extension Length) + 1)
              & { <Extension Information > ! { bit ** = <no
              string> } } > } ;
< Extension Information> : : =
    { 0 | 1 -  EGPRS supported by the cell if the choice bit is set to '1'
              <EGPRS_PACKET_CHANNEL_REQUEST : bit>
              < BEP_PERIOD : bit (4) > }
    <PFC_FEATURE_MODE: bit>
    <DTM_SUPPORT: bit>
    <BSS_PAGING_COORDINATION: bit>
    <spare bit > ** ;
```

The DTM-SUPPORT here comprises a signal-bit field in which a "zero" logical value indicates that the cell does not support DTM procedures, and a logical "one" value to indicate that the cell supports DTM procedures.

In an implementation in which the UE, when registering with the network, sends a SIP REGISTER request, the message includes an accept header. The accept header indicates the supported media bodies in the response. The presence or absence of the media type is taken as an indicator that the UE does, or does not, support ICS or DTM. In one implementation, not including the media type indicates that a SIM swap has been performed by a user of the UE, and the UE being used is a non-ICS-capable UE. In another embodiment, the UE includes an XML body in the SIP REGISTER request to signal support for some ICS options, such as I1, DTM, or others.

The XML body comprises, for instance, the existing media type, e.g., "application/3GPP-IMS+XML". The content-disposition header value comprises, for instance, a 3GPP-alternative-service or 3GPP-service-info value or a new value. Or, a new media type is allocated. A default content-disposition header value for the new media type would, in this implementation, be allocated. Two XML structures are presented below:

```
<xs:complexTypename="tSupportedDTM">
    <xs:choice>
        <xs:element name="DTM" minOccurs="0">
            <xs:complexType/>
        </xs:element>
        <xs:element name="no-DTM" minOccurs="0">
            <xs:complexType/>
        </xs:element>
    </xs:choice>
</xs:complexType>
<xs:simpleType name="eSupportedDTM">
    <xs:restriction base="xs:string">
        <xs:enumeration value="DTM"/>
        <xs:enumeration value="no-DTM"/>
    </xs:restriction>
</xs:simpleType>
```

The XML structures are a tSsupported DTM structure and an eSupported DTM structure. One of these two structures is referenced from either the new XML schema or the XML schema known as "application/3GPP-IMS less XML". In other implementations, other XML schema representations are instead created, such as DTD or relax NG to contain analogous information. In one implementation, extension hooks are also included using, e.g., [SX: any attribute/] or [SX: any name="number number any" process contents="LEX" min occurs="zero" max occurs="unbounded"/]. The XML structures become an element, element content, or an attribute in the new XML schema or XML schema known by the MIME type of "application/3GPP-IMS+XML".

Figure 14:
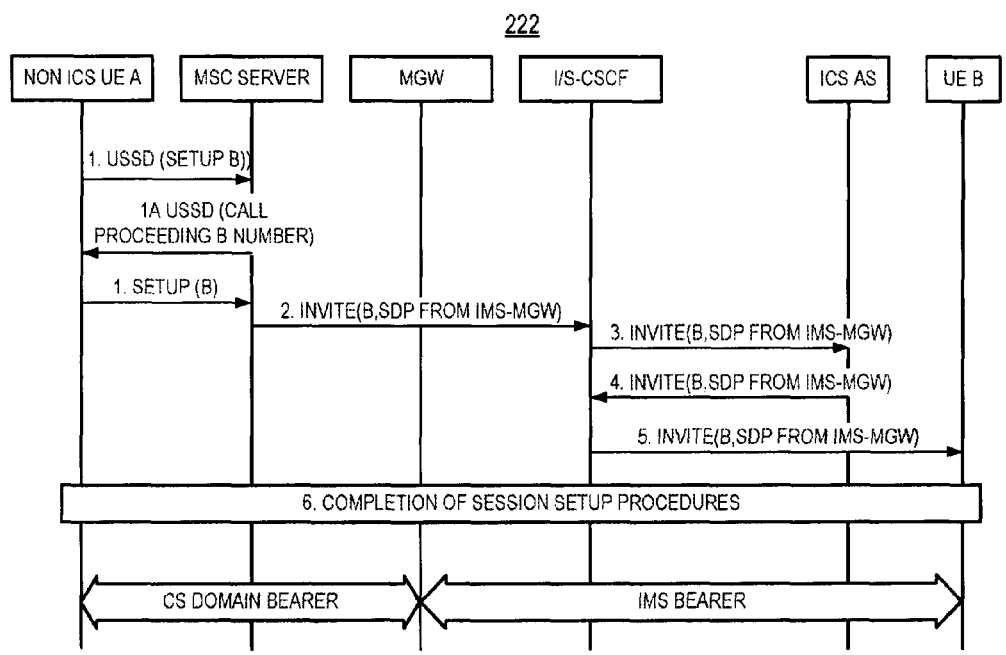
FIG. 14 illustrates a message sequence diagram representative of signaling generated during exemplary operation of another embodiment of the present disclosure.

FIG. 14 illustrates a message sequence diagram, shown generally at 222, representative of tunneling information flows generated during operation of an embodiment of the present disclosure. Here, the exemplary signaling is between a non-ICS UE "A" and a second UE, UE "B". First, the UE sends I1 USSD set-up to the network. The message contains a B number and/or a SIP URI coded in the facility part of the set-up message. The network node intercepts the USSD message, which is recognized as an I1 message. And, the network responds with a call proceeding containing a RUA PSI, which, here, is the originally-sent B number. Thereafter, the UE A sends a set-up message using normal circuit-switched signaling to set-up the bearer using the number that is received in the call proceeding message. The MSC server of the network constructs an INVITE message and sends the message together with the B number. If privacy is invoked by the UE A the MSC server sends a T-GRUU in the contact address; otherwise, the MSC sends a P-GRUU.

Figure 15:
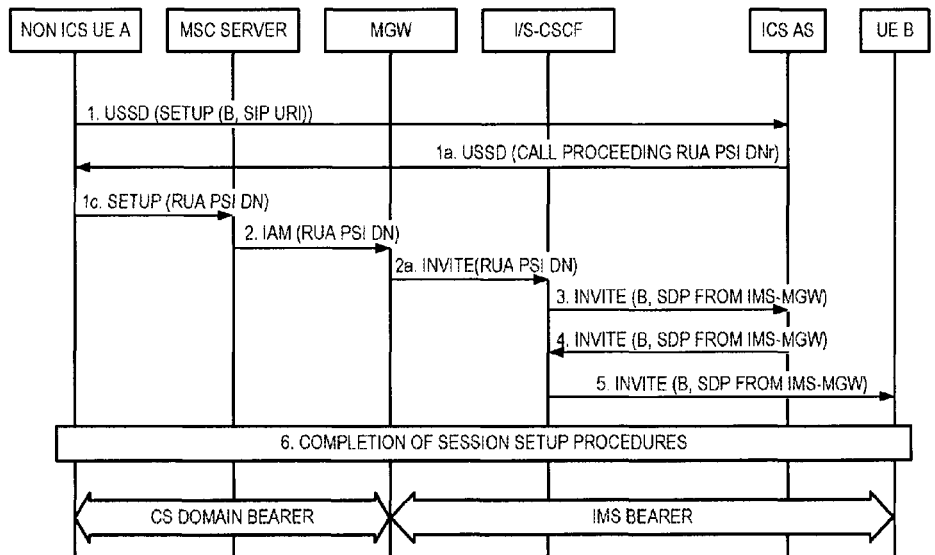
FIG. 15 illustrates a message sequence diagram, also representative of signaling generated during exemplary operation of an embodiment of the present disclosure.

FIG. 15 illustrates a message sequence diagram, shown generally at 232, representative of a call set-up by way of a non-enhanced MSC server. The communication session is again between a non-ICS-capable UE A and a UE B. Here, the UE A sends an I1 USSD set-up message to the network. The message contains a Bnumber, i.e., the number of the UE B, and/or a SIP URI coded in the facility part of the set-up message. The network responds with a call proceeding that contains a RUA PSI. The UE A then sends a set-up message using normal circuit-switched signaling to set-up the bearer using the number received in the call proceeding message. And, the MSC constructs an JAM and sends the JAM with the RUA PSI number.

Figure 16:
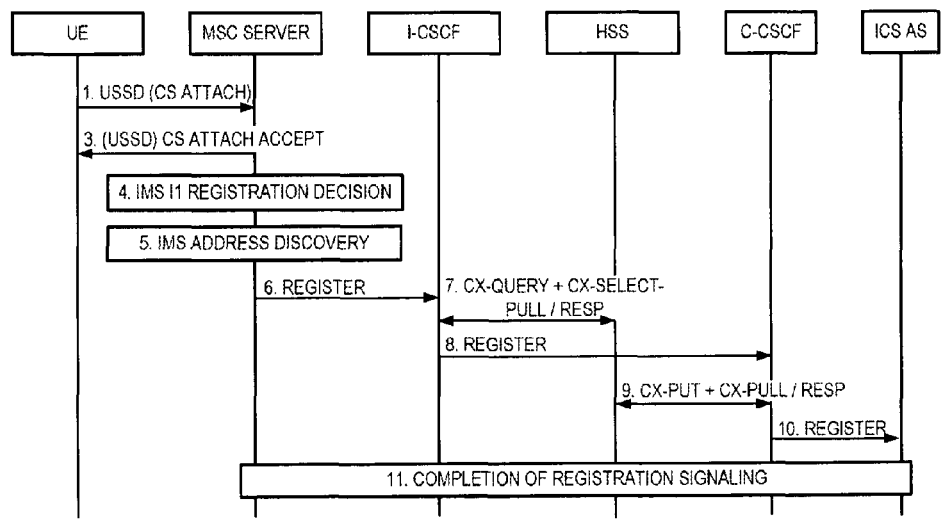
FIG. 16 illustrates another message sequence diagram, also representative of exemplary operation of an embodiment of the present disclosure.

FIG. 16 illustrates a message sequence diagram, shown generally at 242, representative of signaling pursuant to a lack of Gm notification in which the MSC server is enhanced for ICS. First, the UE discovers that the Gm interface is no longer available and, in response, performs an I1 USSD circuit-switched attach message. The MSC detects the I1 registration and the indication that the message is a USSD attach. And, the MSC returns an accept to the UE.

The MSC determines that a registration is required and constructs a registration message. The message contains a flag, such as media feature-tag defined in RFC3840, which indicates that Gm is no longer available. The message also contains an indication that the registration is from the MSC server. And, the registration message is sent to the IMS network.

Figure 17:
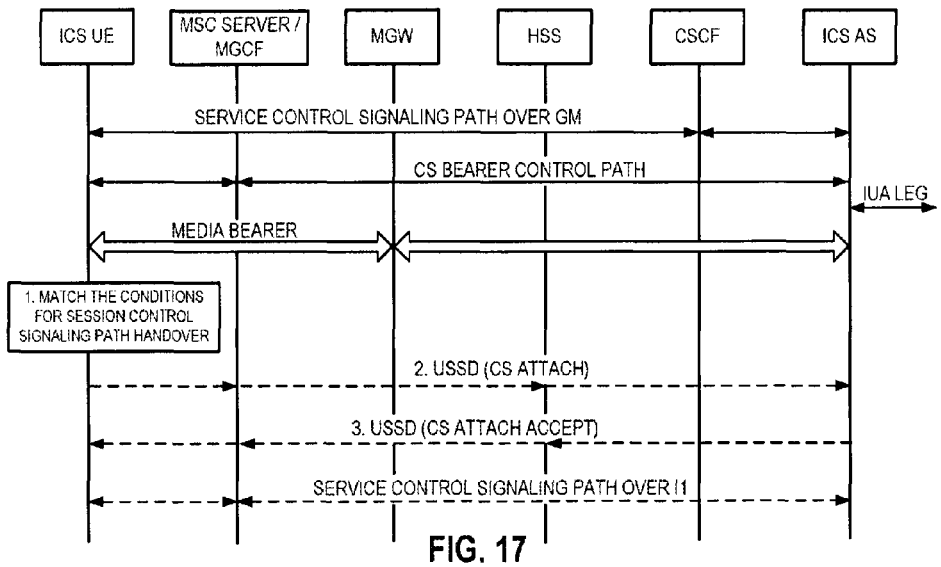
FIG. 17 illustrates a message sequence diagram representative of exemplary signaling generated during operation of an embodiment of the present disclosure.

FIG. 17 illustrates another message sequence diagram, shown generally at 252, representative of signaling generated with lack of Gm notification and wherein the network does not include an MSC server that is enhanced for ICS. Here, the UE discovers the lack of the Gm interface. And, the UE sends a USSD message that contains a circuit-switched attach. The ICS detects the USSD message, which contains the circuit-switched attach and the access server marks the UE as not having any Gm capability in the T-ADS. Subsequent session-control signaling takes place over the I1 interface.

Figure 18:
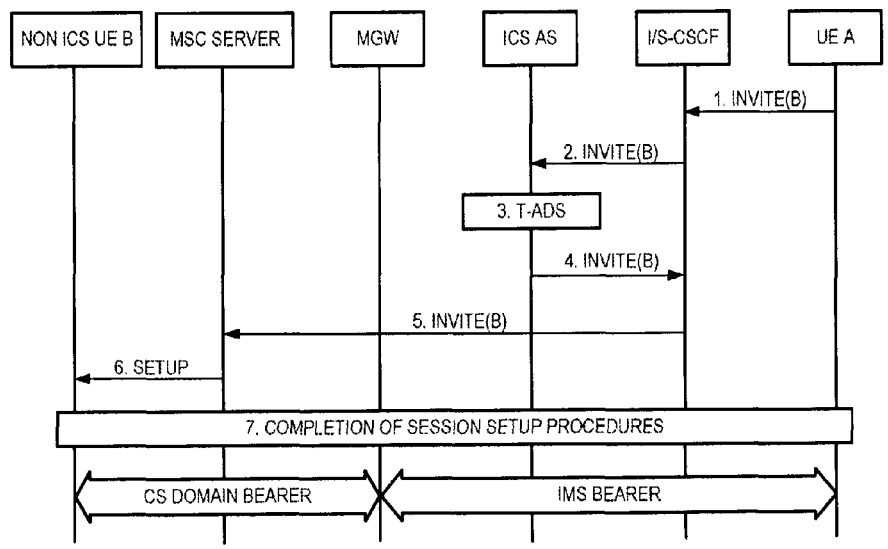
FIG. 18 illustrates another message sequence diagram, also representative of exemplary operation of an embodiment of the present disclosure.

FIG. 18 illustrates a message sequence diagram, shown generally at 262, representative of exemplary signaling of a call by way of an MSC server that is enhanced for ICS and in which the UE is locally served. The call is mobile-terminated. The ICS AS knows that the ICS UE does not have Gm capability, so call routing is selected to the enhanced MSC server for the ICS. And, when the MSC server receives the INVITE message, the server knows that the UE is ICS-capable and that the UE is hosted by the MSC server, or analogous network structure, and sends a normal set-up message to the UE to complete the call.

Figure 19:
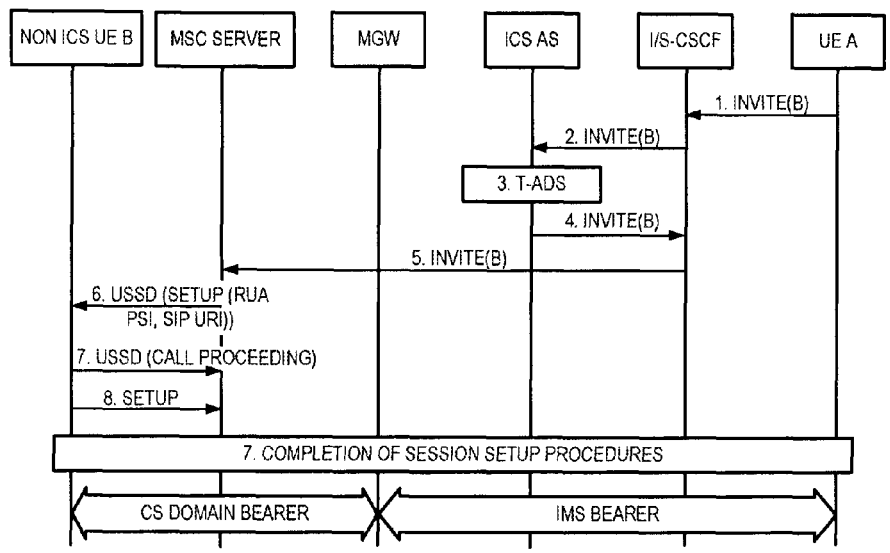
FIG. 19 illustrates a message sequence diagram representative of exemplary operation of an embodiment of the present disclosure.

FIG. 19 illustrates a message sequence diagram, shown generally at 272, when the UE does not have Gm capability. Here, the ICS AS is aware that the UE does not have Gm capability, and the access server selects to route the call to the enhanced MSC server for ICS. The MSC server receives an INVITE message and the server knows that the UE is ICS-capable but not hosted by the MSC server, that is to say, the UE is roaming. The server sends a set-up message in USSD. The UE responds with a call proceeding message. The MSC server, which receives an INVITE message, knows that the UE is ICS-capable and is hosted by the MSC server, or analogous network entity, but sends a normal set-up message to the UE to complete the call.

Figure 20:
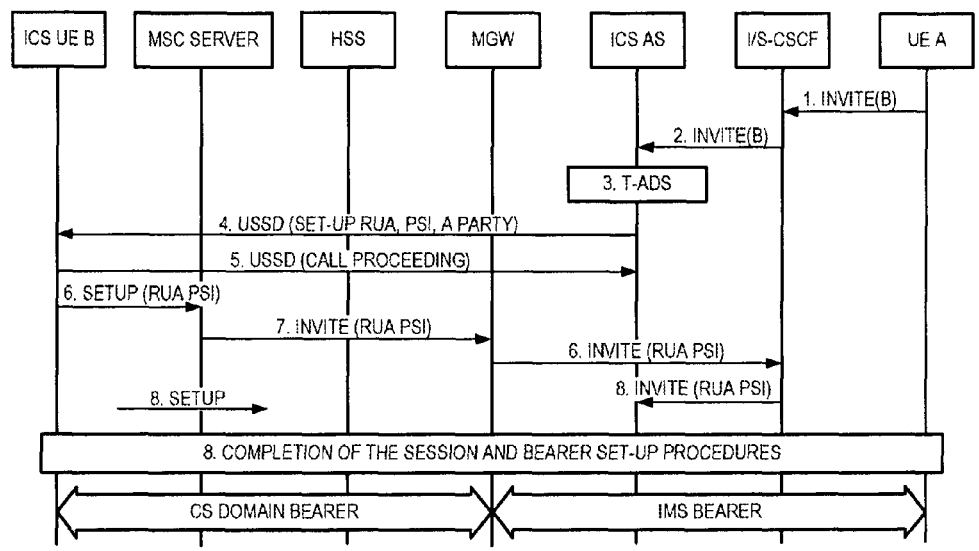
FIG. 20 illustrates a message sequence diagram representative of exemplary operation of an embodiment of the present disclosure.

FIG. 20 illustrates a message sequence diagram, shown generally at 292, representative of signaling generated during operation of an embodiment of the present disclosure in which a mobile-terminated call is placed in a network having a non-enhanced MSC server. First, an incoming SIP INVITE message is received at an S-CSCF of the UE B. In response to the message, the S-CSCF executes terminating initial filter criteria and forwards the INVITE message to the ICS AS. The ICS AS terminates the session from the A-party and performs terminating access domain selection to select a contact address for the chosen access network amongst the registered contact addresses for the ICS user. The ICS AS chooses the circuit-switched, access network for the set-up of the media. The TADs also knows that the UE has not Gm and no enhanced MSC, so the I1 interface is chosen to set-up the call.

The ICS AS sends a set-up message, tunneled in USSD, which contains the IUA PSI DN to the UE over the I1 reference point. The ICS UE A responds back with a call proceeding message, tunneled in USSD. The ICS UE A uses standard, circuit-switched, originating procedures to establish a circuit-switched, bearer control signaling path with the IUA of the ICS AS by sending a set-up message to the MSC server containing the IUA PSI DN.

The MSC server sends the INVITE message, using the IUA PSI DN, to an S-CSCF. The S-CSCF carries out standard processing of originating initial filter criteria and sends the INVITE message to the ICS AS. The IUA of the ICS AS invokes a B2BUA, terminating the UE leg. The IUA correlates the circuit-switched bearer control signaling session with the service control signaling session using the IUA PSI, thereby to complete the session and bearer set-up.

Thereby, various manners are presented by which to facilitate operation of a wireless device, such as a UE, that is ICS-capable.

Presently preferred embodiments of the disclosure and many of its improvements and advantages have been described with a degree of particularity. The description is of preferred examples of implementing the disclosure and the description of preferred examples is not necessarily intended to limit the scope of the disclosure. The scope of the disclosure is defined by the following claims.

What is claimed is:

1. A Session Initiation Protocol (SIP) access server comprising:
    a transmitter configured to transmit a first SIP message to a first user equipment, wherein the first SIP message is a SIP invite message to establish a voice call;
    a receiver configured to receive, in response to transmitting of the first SIP message, a SIP error code from the first user equipment; and
    the transmitter is configured to, in response to receiving the SIP error code, transmit a second SIP message containing a media feature tag that is embodied in an accept contact header part of the second SIP message, wherein the media feature tag in the second SIP message indicates that a circuit-switched domain is used for signaling, wherein the transmitting of the second SIP message causes setup of a first communication leg in the circuit-switched domain with the first user equipment for the voice call, and wherein communication of bearer traffic for the voice call is to occur over the first communication leg in the circuit-switched domain and a second communication leg in a packet-switched domain.

2. The access server of claim 1, wherein the media feature tag is configured to at least one of:
    identify that the first user equipment does not support IP Multimedia Subsystem Centralized Service (ICS);
    identify that a network does not support ICS; and identify that the first user equipment is not Dual Transfer Mode (DTM) capable.

3. The access server of claim 1, wherein the SIP error code is indicated by one of a SIP 406 message, a SIP 480 message, or a SIP 606 message.

4. The access server of claim 1, wherein the access server is configured to:
in response to receiving the SIP error code, determine whether the signaling is able to be established in the circuit-switched domain,
wherein sending the second SIP message is in response to determining that the signaling is able to be established in the circuit-switched domain.

5. The access server of claim 4, wherein the access server is configured to consult a domain selection function to perform the determining.

6. The access server of claim 1, wherein the SIP error code is received in response to a rejection by the first user equipment of the first SIP message based on a determination by the first user equipment that the first SIP message is associated with an IP Multimedia Subsystem Centralized Service (ICS) not supported by the first user equipment.

7. The access server of claim 1, further comprising obtaining a routing number to direct the signaling and bearer traffic to a visited network mobile switching center in the circuit-switched domain.

8. A method performed at a Session Initiation Protocol (SIP) access server, the method comprising:
sending a first SIP message to a first user equipment, wherein the first SIP message is a SIP invite message to establish a voice call;
receiving, in response to sending of the first SIP message, a SIP error code from the first user equipment;
in response to the SIP error code, sending a second SIP message containing a media feature tag that is embodied in an accept contact header part of the second SIP message, wherein the media feature tag in the second SIP message indicates that a circuit-switched domain is used for signaling,
wherein the sending of the second SIP message causes setup of a first communication leg in the circuit-switched domain with the first user equipment for the voice call, and wherein communication of bearer traffic for the voice call is to occur over the first communication leg in the circuit-switched domain and a second communication leg in a packet-switched domain.

9. The method of claim 8 further comprising obtaining a routing number to direct the signaling and bearer traffic for the circuit-switched domain.

10. The method of claim 8 wherein the media feature tag further indicates that IP Multimedia Subsystem Centralized Service (ICS) is not supported and indicates that a user equipment is not Dual Transfer Mode (DTM) capable.

11. The method of claim 8 wherein the SIP error code is indicated by one of a SIP 406 message, a SIP 480 message, or a SIP 606 message.

12. The method of claim 8, further comprising:
in response to receiving the SIP error code, determining, by the access server, whether the signaling is able to be established in the circuit-switched domain,
wherein sending the second SIP message is in response to determining that the signaling is able to be established in the circuit-switched domain.

13. The method of claim 12, wherein the determining comprises the access server consulting with a domain selection function.

14. The method of claim 13, further comprising obtaining a routing number to direct the signaling and bearer traffic to a visited network mobile switching center in the circuit-switched domain.

* * * * *